(12) United States Patent
Abe et al.

(10) Patent No.: US 9,383,779 B2
(45) Date of Patent: Jul. 5, 2016

(54) INFORMATION PROCESSING DEVICE

(71) Applicant: FUJITSU LIMITED, Kawasaki-shi, Kanagawa (JP)

(72) Inventors: Takashi Abe, Kawasaki (JP); Yutaka Sato, Kawasaki (JP); Yasufumi Yamamoto, Kawasaki (JP); Sonomasa Kobayashi, Kawasaki (JP); Hiroyuki Fujita, Suginami (JP)

(73) Assignee: FUJITSU LIMITED, Kanagawa (JP)

( * ) Notice: Subject to any disclaimer, the term of this patent is extended or adjusted under 35 U.S.C. 154(b) by 58 days.

(21) Appl. No.: 14/336,742

(22) Filed: Jul. 21, 2014

(65) Prior Publication Data

US 2015/0062808 A1 Mar. 5, 2015

(30) Foreign Application Priority Data

Aug. 29, 2013 (JP) ................................. 2013-178116

(51) Int. Cl.
*G06F 1/16* (2006.01)
(52) U.S. Cl.
CPC ............ *G06F 1/1681* (2013.01); *G06F 1/1643* (2013.01)
(58) Field of Classification Search
CPC combination set(s) only.
See application file for complete search history.

(56) References Cited

U.S. PATENT DOCUMENTS

| | | | | | |
|---|---|---|---|---|---|
| 5,205,017 | A | * | 4/1993 | Wang | G06F 1/162 16/366 |
| 5,206,790 | A | * | 4/1993 | Thomas | F16M 11/10 16/342 |
| 6,989,985 | B2 | * | 1/2006 | Tanimoto | G06F 1/162 16/255 |
| 7,027,297 | B1 | * | 4/2006 | Mizuno | G06F 1/162 16/337 |
| 7,047,598 | B2 | * | 5/2006 | Huang | G06F 1/1681 16/312 |
| 7,129,931 | B2 | * | 10/2006 | Pappas | G06F 1/1601 345/168 |
| 7,155,781 | B2 | * | 1/2007 | Yamada | G06F 1/162 16/367 |
| 7,513,013 | B2 | * | 4/2009 | Hsieh | G06F 1/1681 16/367 |
| 7,656,661 | B2 | * | 2/2010 | Shaum | G06F 1/1616 361/679.55 |
| 7,663,874 | B2 | * | 2/2010 | Hattori | G06F 1/162 340/870.11 |
| 7,847,741 | B2 | * | 12/2010 | Hirota | G06F 1/162 343/702 |

(Continued)

FOREIGN PATENT DOCUMENTS

| | | |
|---|---|---|
| JP | 11-247837 A | 9/1999 |
| JP | 2004-153589 A | 5/2004 |
| JP | 2006-125560 A | 5/2006 |

*Primary Examiner* — Lisa Lea Edmonds
(74) *Attorney, Agent, or Firm* — Westerman, Hattori, Daniels & Adrian, LLP

(57) ABSTRACT

An information processing device includes a first case, a second case over which the first case is placeable, and a connector including a first rotation part and a second rotation part and configured to couple the first case on the second case, the first rotation part allowing the first case to be rotated about a first axis, the second rotation part allowing the first case to be rotated about a second axis, the second axis being displaced from a central position of the first case in an axial direction of the first axis, wherein when front and back surfaces of the first case are reversed and the first case is placed over the second case, at least part of the first case projects from the second case toward an outer side.

19 Claims, 29 Drawing Sheets

(56) References Cited

U.S. PATENT DOCUMENTS

| | | | |
|---|---|---|---|
| 8,250,713 B2* | 8/2012 | Lin | E05D 11/0081 16/309 |
| 8,434,198 B2* | 5/2013 | Nagami | B60R 11/0235 16/367 |
| 9,019,713 B2* | 4/2015 | Wu | H05K 7/14 361/679.27 |
| 2004/0063476 A1 | 4/2004 | Katagishi et al. | |
| 2004/0258464 A1* | 12/2004 | Chang | F16M 11/12 403/161 |
| 2005/0060843 A1* | 3/2005 | Hung | G06F 1/1681 16/367 |
| 2005/0246741 A1* | 11/2005 | Liu | G06F 1/162 725/50 |
| 2006/0094482 A1* | 5/2006 | Takagi | G04M 1/0212 455/575.3 |
| 2007/0081304 A1* | 4/2007 | Takeguchi | G06F 1/162 361/679.27 |
| 2007/0206350 A1* | 9/2007 | Shimamoto | G06F 1/162 361/679.55 |
| 2007/0227873 A1* | 10/2007 | Kawasaki | G06F 1/1613 200/443 |
| 2008/0034548 A1* | 2/2008 | Chien | G06F 1/162 16/367 |
| 2008/0034550 A1* | 2/2008 | Chang | G06F 1/1681 16/367 |
| 2008/0076490 A1* | 3/2008 | Kosugi | F16M 11/12 455/575.3 |
| 2008/0078061 A1* | 4/2008 | Hsu | G06F 1/162 16/367 |
| 2008/0120805 A1* | 5/2008 | Su | G06F 1/162 16/239 |
| 2010/0180403 A1* | 7/2010 | Wei | G06F 1/162 16/371 |
| 2011/0085297 A1* | 4/2011 | Wright-Johnson | G06F 1/1681 361/679.55 |
| 2011/0110670 A1* | 5/2011 | Atkinson | G06F 1/162 398/135 |
| 2014/0009881 A1* | 1/2014 | Kinoshita | G06F 1/1637 361/679.28 |
| 2014/0055923 A1* | 2/2014 | Mori | H05K 5/0226 361/679.01 |

* cited by examiner

FIG. 14

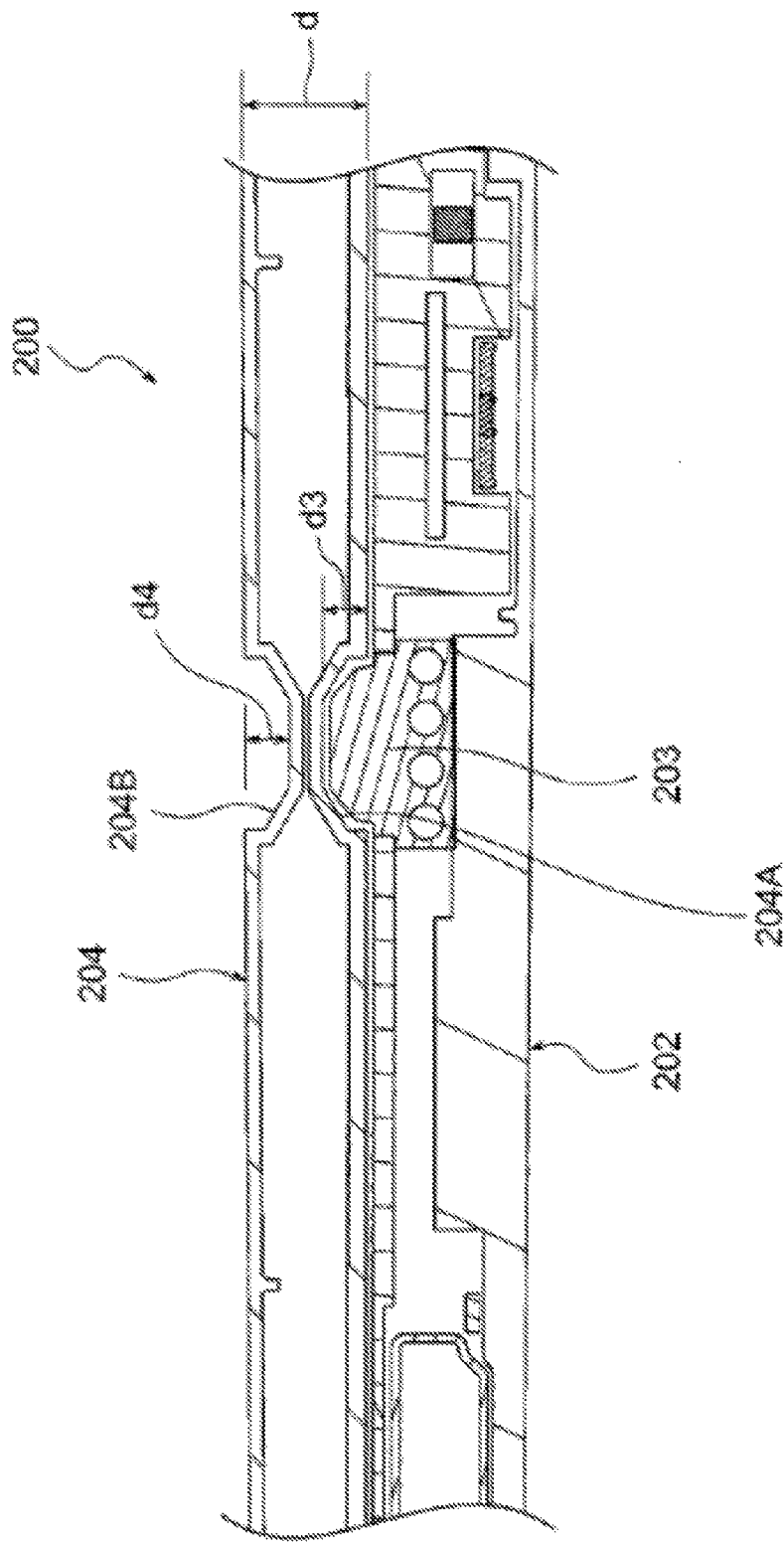

INFORMATION PROCESSING DEVICE

CROSS-REFERENCE TO RELATED APPLICATION

This application is based upon and claims the benefit of priority from the prior Japanese Patent Application No. 2013-178116 filed on Aug. 29, 2013, the entire contents of which are incorporated herein by reference.

FIELD

The technology disclosed in the present application relates to an information processing device.

BACKGROUND

A known conventional information processing device has a biaxial rotation mechanism which allows a first case to be reversed and placed over the second case. Such a technology is described, for example, in Japanese Laid-open Patent Publication No. 2006-125560.

SUMMARY

According to an aspect of the invention, an information processing device includes a first case, a second case over which the first case is placeable, and a connector including a first rotation part and a second rotation part and configured to couple the first case on the second case, the first rotation part allowing the first case to be rotated about a first axis, the second rotation part allowing the first case to be rotated about a second axis, the second axis being displaced from a central position of the first case in an axial direction of the first axis, wherein when front and back surfaces of the first case are reversed and the first case is placed over the second case, at least part of the first case projects from the second case toward an outer side.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is an enlarged partial perspective view illustrating the first rotation part according to the first embodiment.

FIG. 29 is a vertical cross-sectional view illustrating a projection part, a first recessed part, and a second recessed part of the personal computer according to the comparative example.

DESCRIPTION OF EMBODIMENTS

In an information processing device based on a conventional technology, in the case where a communication unit is provided at the end of a first case that is on the opposite side to a rotation mechanism, when a second case is placed over the first case, radio waves may be blocked by the second case and the communication performance of the communication unit may be decreased.

Thus, the technology disclosed in the present application provides, as an aspect thereof, an information processing device capable of avoiding decrease in the communication performance in radio communications.

First Embodiment

A first embodiment of the technology disclosed in the present application will be described.

Figure 1:
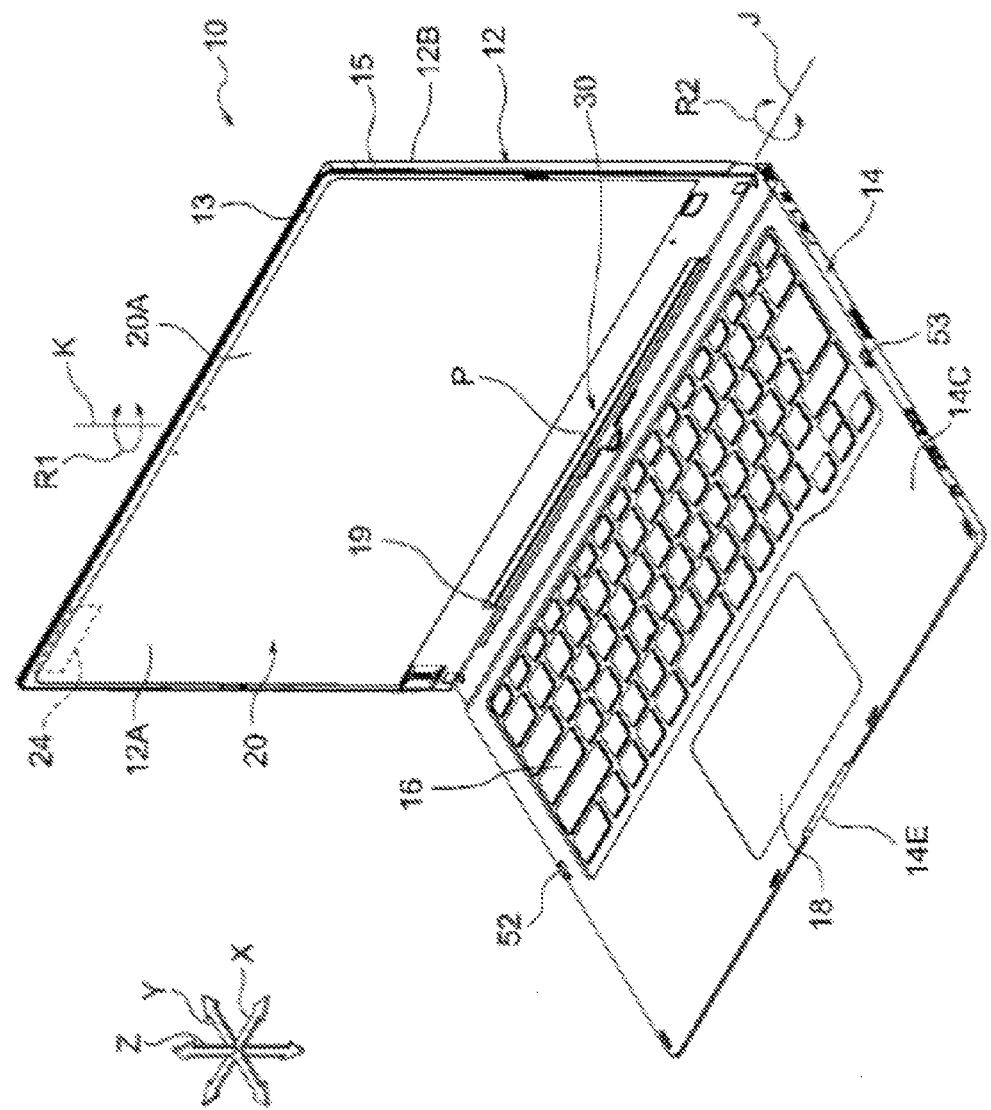
FIG. 1 is a perspective view illustrating an open state of a personal computer according to a first embodiment.
Figure 2:
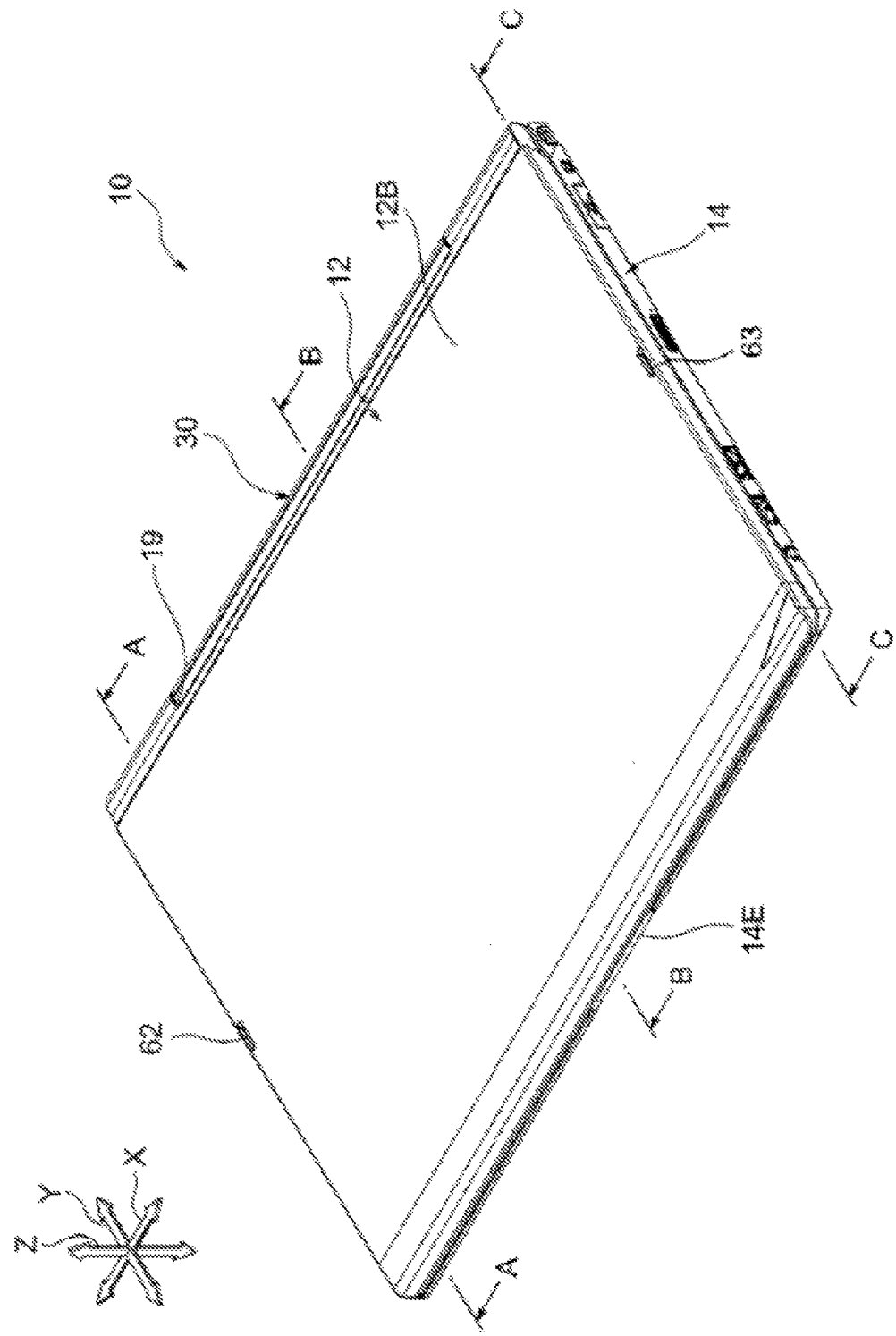
FIG. 2 is a perspective view illustrating a first closed state of the personal computer according to the first embodiment.
Figure 3:
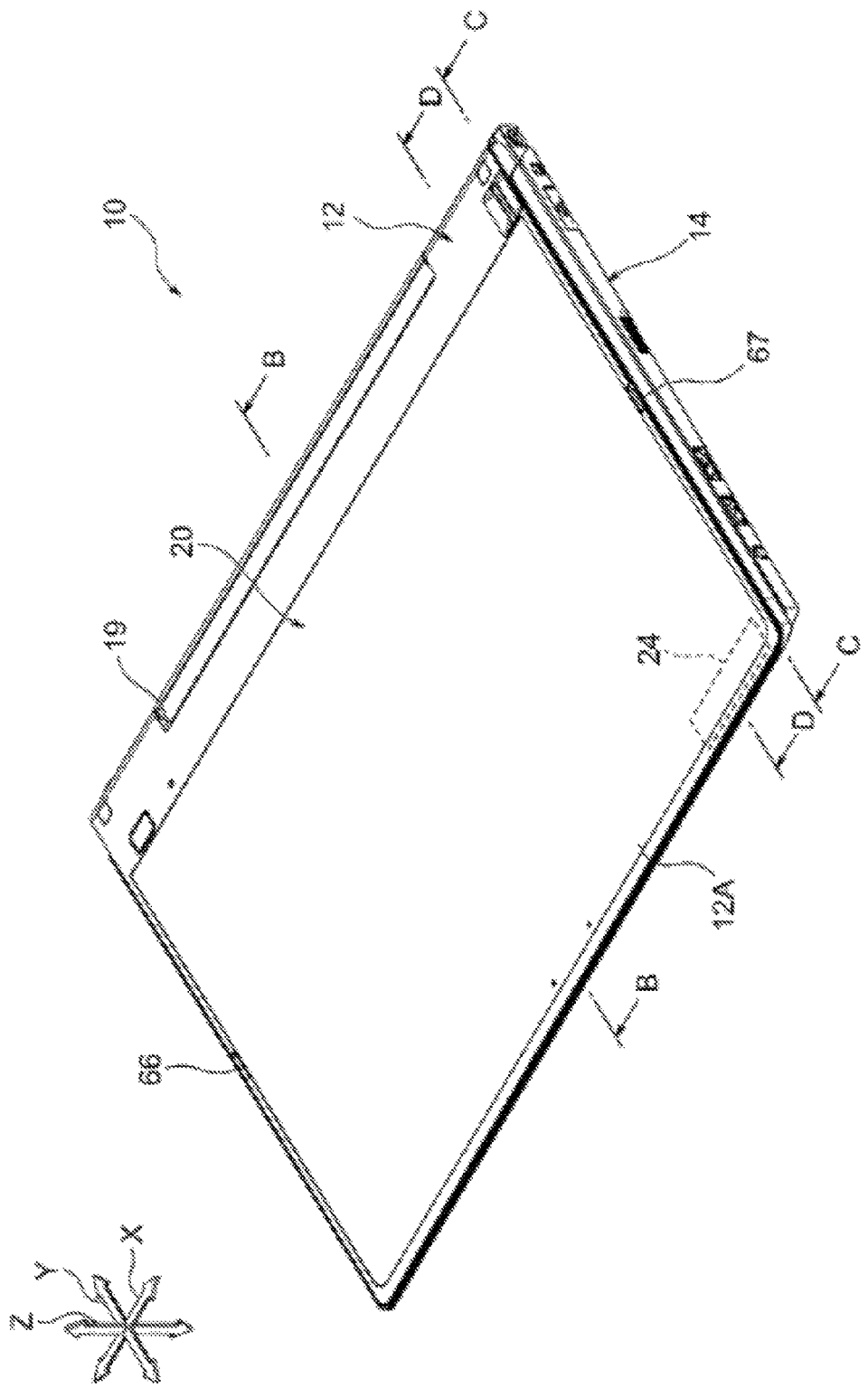
FIG. 3 is a perspective view illustrating a second closed state of the personal computer according to the first embodiment.

FIGS. 1, 2, and 3 illustrate a notebook personal computer 10 as an example information processing device.

The personal computer 10 has a display case 12 as an example of a first case, a main body case 14 as an example of a second case, and a connector 30 that connects the display case 12 and the main body case 14. In each of the drawings, the width direction, the depth direction, and the thickness direction (up and down direction) of the personal computer 10 are indicated by arrow X, arrow Y, and arrow Z, respectively. The X direction, the Y direction, and the Z direction are perpendicular to one another. For description of disposition of each member of the personal computer 10, the right side, the left side, the front side, the back side, the upper side, and the lower side are defined with respect to the below-described display panel 20 which is viewed from the front.

As illustrated in FIG. 1, a first axis J is defined as the axis of rotation center about which the display case 12 is rotated when inclined to the main body case 14, and a second axis K is defined as the axis of rotation center about which the display case 12 is rotated when rotated with respect to the main body case 14. The details of the first axis J and the second axis K will be described later.

Herein, an open state is defined as the state in which the display case 12 is open and forms an angle of 90° with the main body case 14 and the below-described display panel 20 faces the front side. In other words, the open state is the state in which the display case 12 extends in the axial direction (the Z direction) of the second axis K through the end of the main body case 14 in the Y direction.

Figure 7:
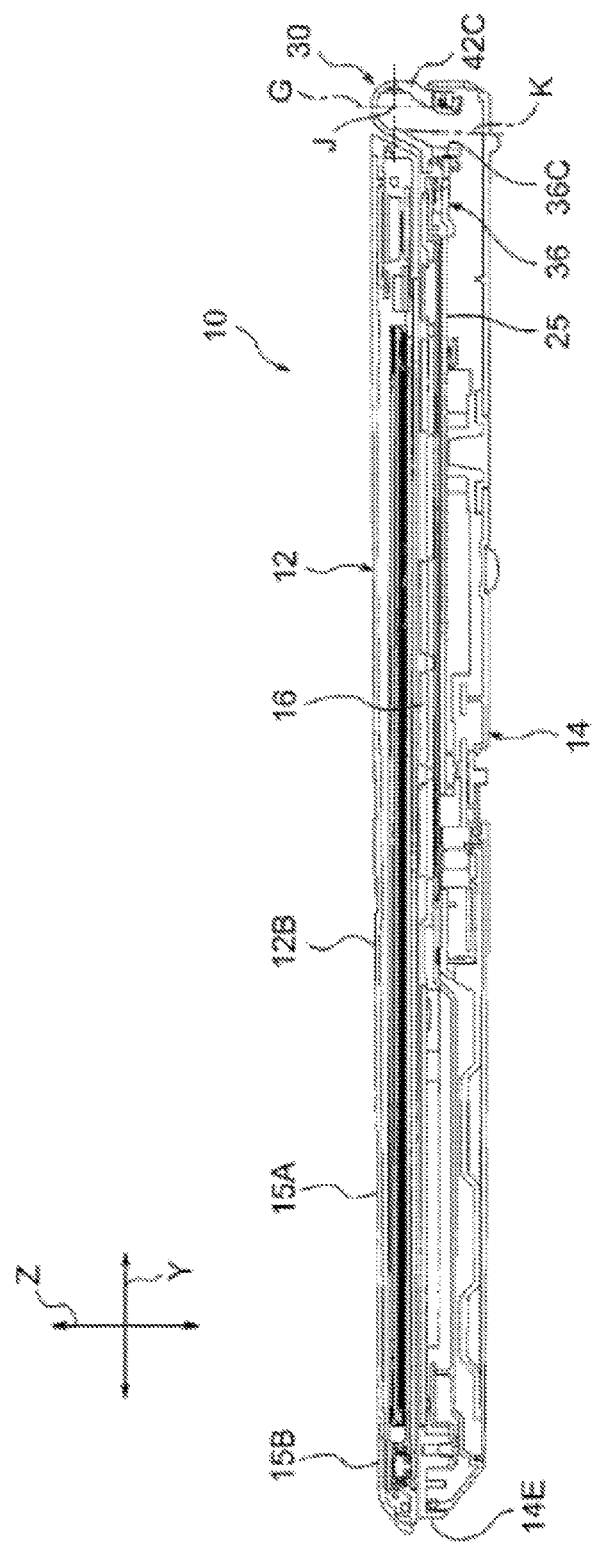
FIG. 7 is a vertical cross-sectional view (cross-section along line B-B of FIG. 2) illustrating the first closed state of the personal computer according to the first embodiment.

As illustrated in FIGS. 2 and 7, a first closed state is defined as the state in which the display case 12 is placed over the main body case 14 with the below-described surface 12B, which is located on the back side of the display case 12, facing the upper side in the Z direction. The surface 12B is located on the opposite side to the below-described display panel 20 (see FIG. 1) in the thickness direction of the display case 12.

In addition, as illustrated in FIG. 3, a second closed state is defined as the state in which the display case 12 is placed over the main body case 14 with the below-described display panel 20 of the display case 12 facing the upper side. Specifically, the second closed state is defined as the state in which the display case 12 is rotated (made to revolve) for 180° about the second axis K in the direction of arrow R1 in the open state illustrated in FIG. 1 so that the display panel 20 faces away from a keyboard 16, and subsequently, the display case 12 is rotated (made to revolve) for 90° about the first axis J in the direction of arrow R2 and is placed over the main body case 14.

FIG. 2 illustrates cutaway lines A-A, B-B, and C-C, the cutaway line A-A extending in the Y direction between the left end and the center in the X direction, the cutaway line B-B extending in the Y direction through the center in the X direction, the cutaway line C-C extending in the Y direction through the right end in the X direction. FIG. 3 illustrates the above-described cutaway lines B-B and C-C, and cutaway line D-D extending in the Y direction nearer to the center than the cutaway line C-C in the X direction.

<Main Body Case>

Figure 5:
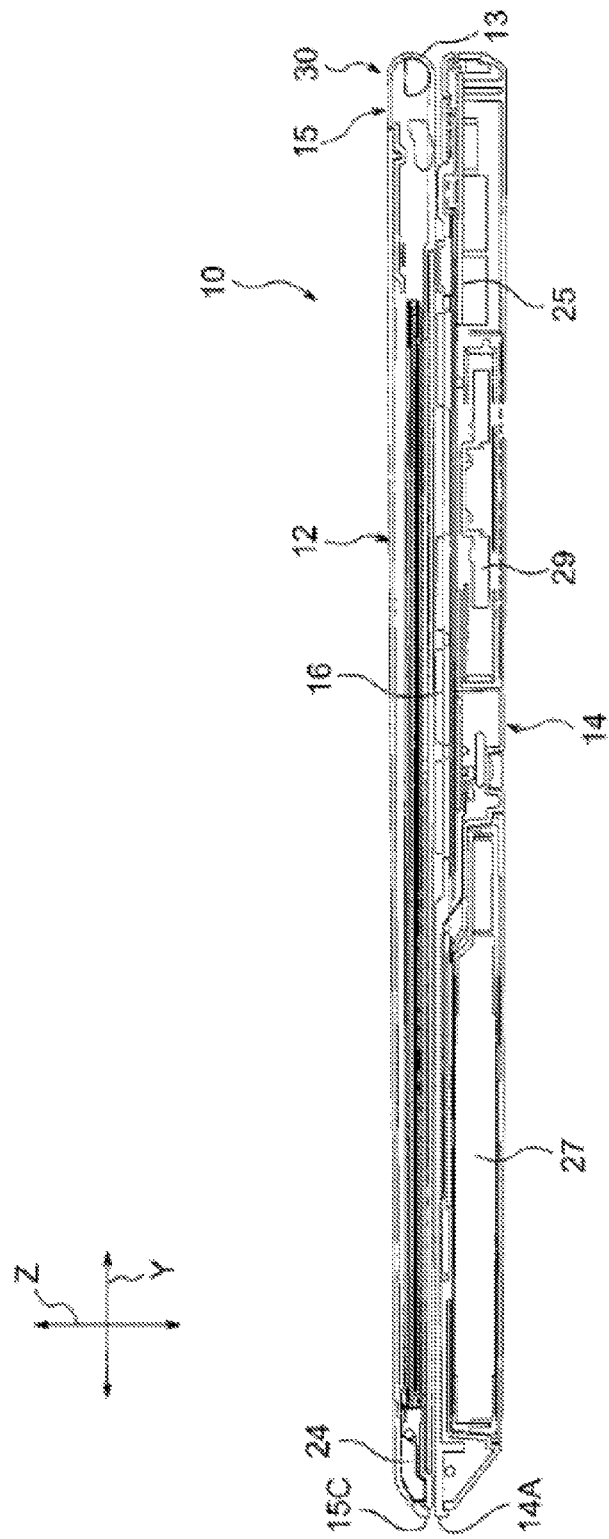
FIG. 5 is a vertical cross-sectional view (cross-section along line A-A of FIG. 2) illustrating the first closed state of the personal computer according to the first embodiment.

As illustrated in FIG. 1, the main body case 14 is formed in a rectangular shape having a longitudinal direction in the width direction in a plan view, and is made of metal (for example, magnesium alloy). As illustrated in FIG. 5, in the main body case 14, a motherboard 25, a battery 27, a fan 29, and a hard disk (not illustrated) are incorporated.

The motherboard 25 includes electronic circuit elements such as a central processing unit (CPU) and a memory (not illustrated), for example. The CPU is configured to perform various arithmetic operations based on a software program and data which are temporarily stored in the memory. The software program and data are stored in the hard disk (not illustrated).

As illustrated in FIG. 1, on the surface (upper surface) of the main body case 14, input devices such as the keyboard 16 and a touchpad 18 are disposed. A plurality of keypads is arranged on the keyboard 16. Various commands and data are inputted to the above-described CPU by a user operating the keyboard 16 and the touchpad 18.

Figure 4:
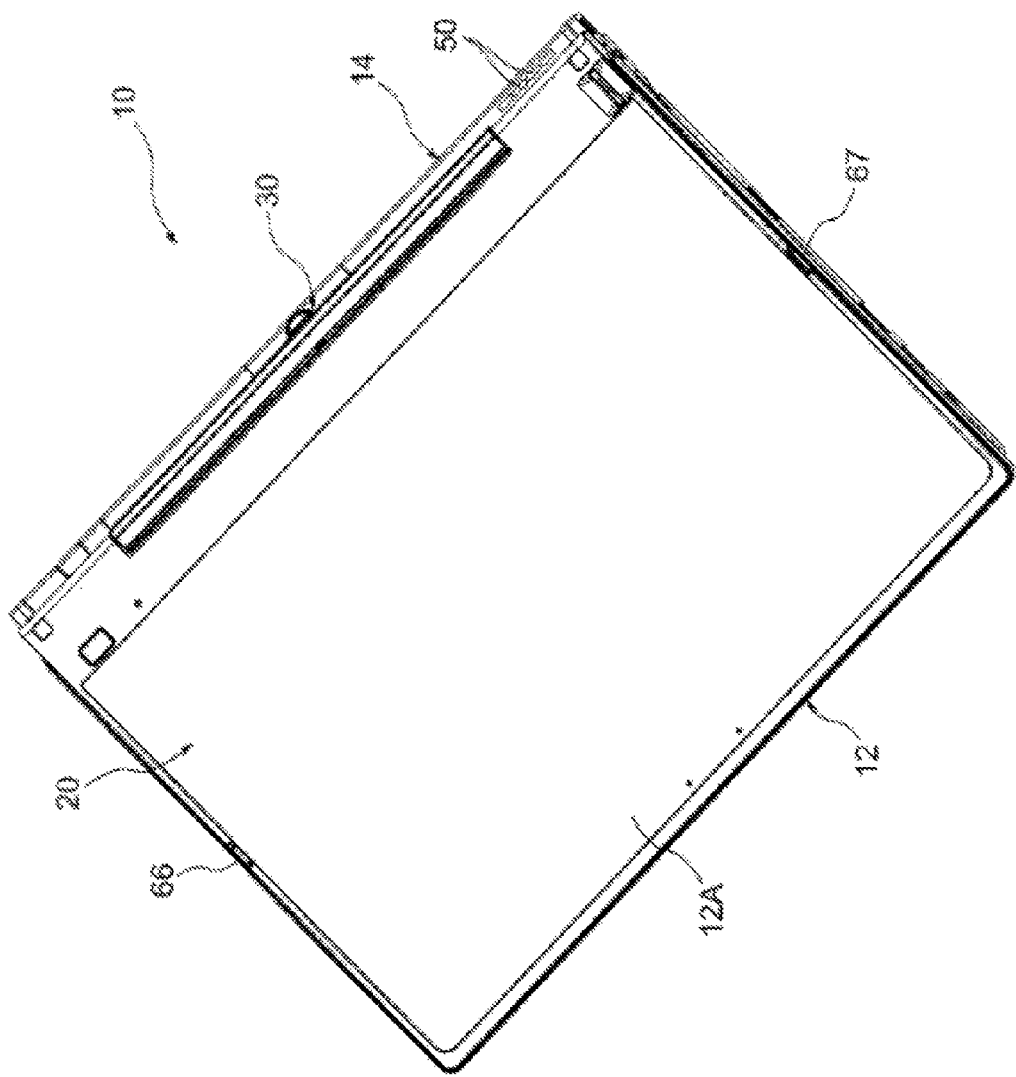
FIG. 4 is a perspective view illustrating the second closed state of the personal computer according to the first embodiment.
Figure 9:
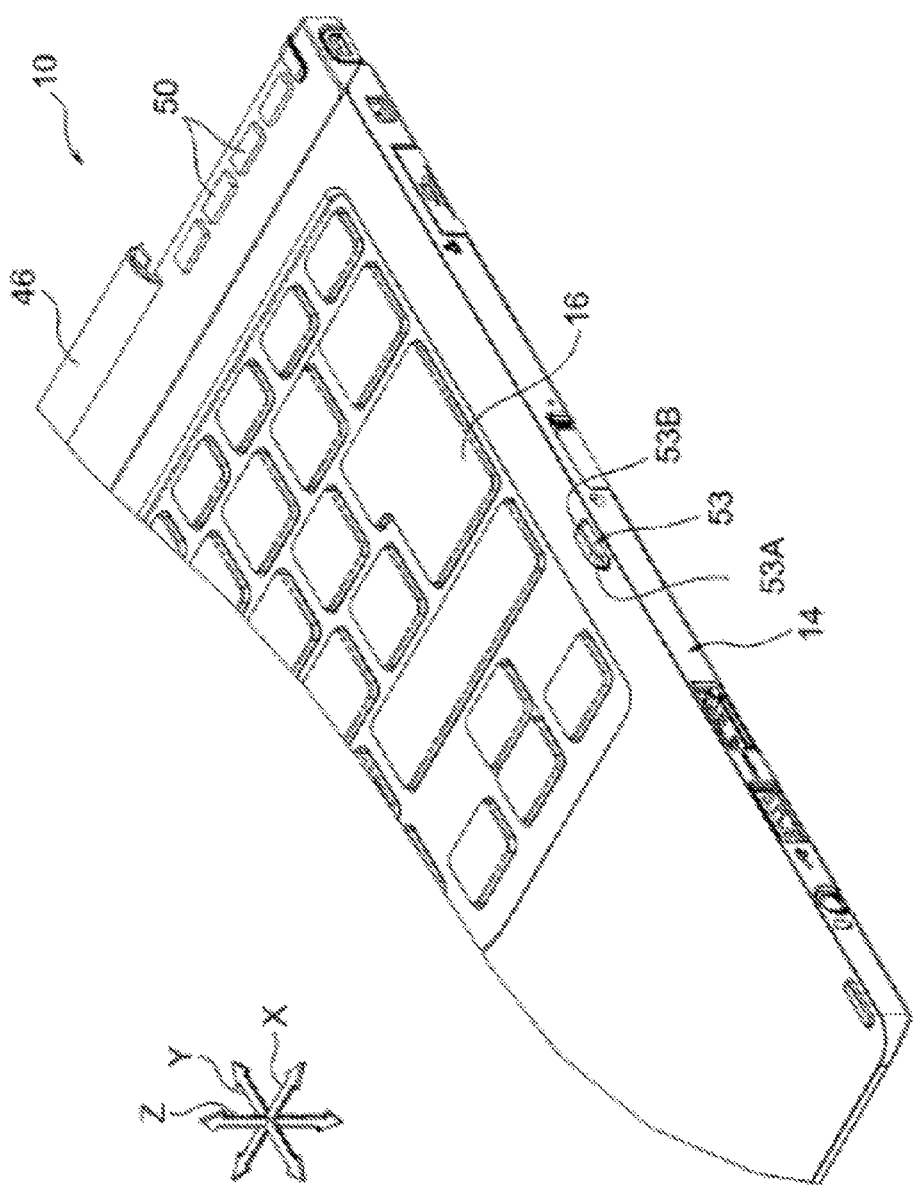
FIG. 9 is an enlarged partial perspective view of a main body case according to the first embodiment.

As illustrated in FIGS. 4 and 9, the right back of the surface of the main body case 14 is provided with application buttons 50 as an example of an operation part. The application buttons 50 are disposed so as to be covered by the display case 12 in the open state and in the first closed state, but are exposed so as to be operated in the second closed state. One of the application buttons 50 serves as, for example, a volume button that changes the volume of sound. In addition, as another example, in the second closed state, input operation is possible with the display panel 20 and one of the application buttons 50 serves as a hard switch (a reset button or a power supply button) when the personal computer 10 is desired to be operated urgently.

Figure 18:
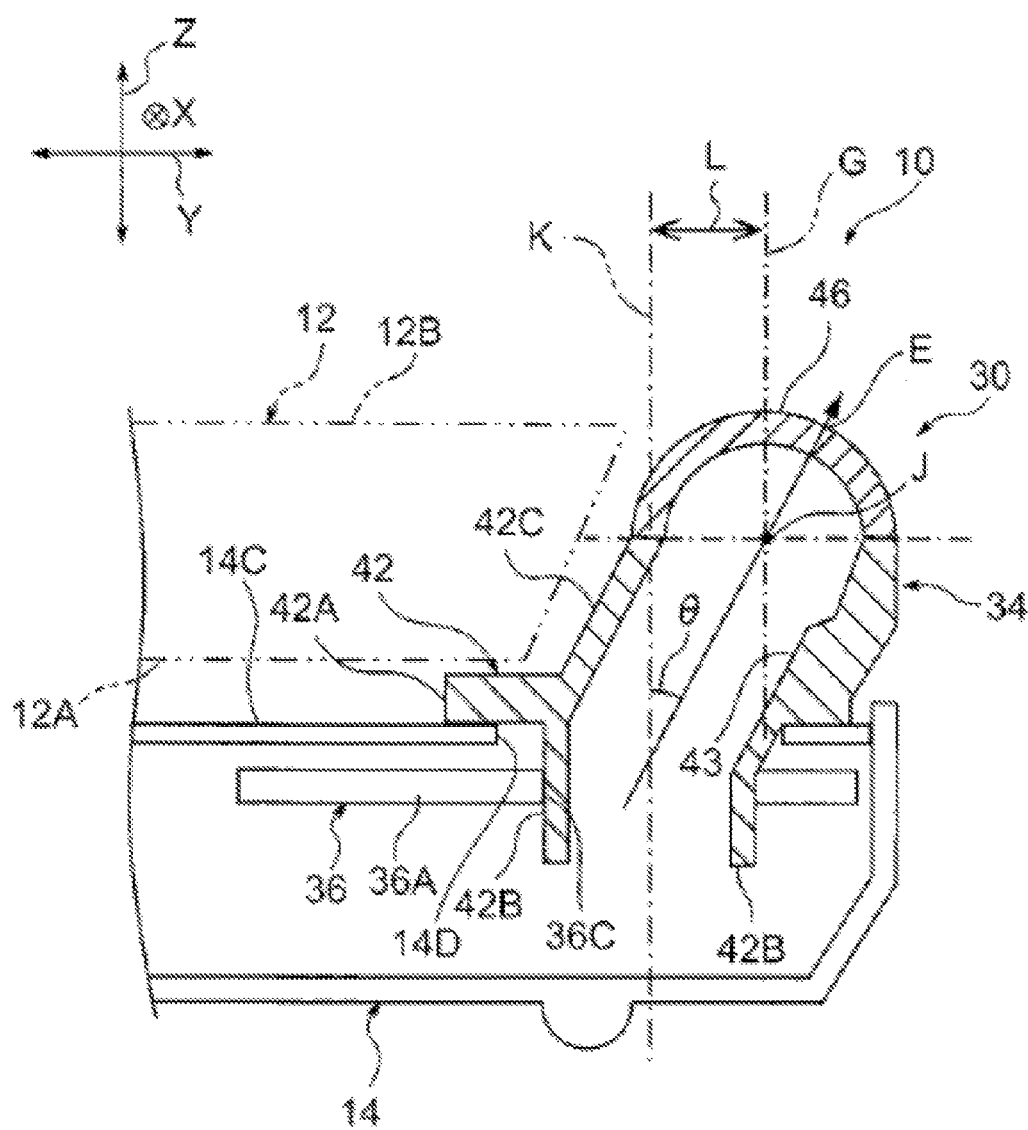
FIG. 18 is a schematic diagram illustrating a cross-sectional view (cross-section along line B-B of FIG. 2) of the second rotation part of the personal computer in the first closed state according to the first embodiment.

As illustrated in FIG. 18, the main body case 14 has a top plate 14C that covers the upper side in the Z direction. The top plate 14C includes a through hole 14D which is through in the Z direction. The through hole 14D has inserted axial part 42B of the second rotation part 34 described below so that the second rotation part 34 is rotatable with respect to the main body case 14.

(Projection Part)

As illustrated in FIG. 1, on the upper surface (the surface on which the keyboard 16 is provided) of the main body case 14, a projection part 52 and a projection part 53 are respectively provided at positions of one end and the other end in the X direction and at the center in the Y direction. The projection part 52 is disposed on the left side and the projection part 53 is disposed on the right side when viewed with the touchpad 18 placed on the front side. Because the projection part 52 and the projection part 53 have the same configuration, the projection part 53 will be described and description of the projection part 52 will not be given.

As illustrated in FIG. 9, the projection part 53 is formed in a rectangular parallelepiped shape having a transverse direction of the X direction and a longitudinal direction of the Y direction. The both ends of the projection part 53 in the Y direction have a tapered surface 53A and a tapered surface 53B, respectively. That is, the projection part 53 is formed in a trapezoidal shape when viewed in the X direction. In addition, the height from the upper surface of the main body case 14 to the upper surface of the projection part 53 is higher than half the thickness d (see FIG. 8) of the display case 12. The projection part 53 has a dimension so as to be insertable in the below-described first recessed parts 66, 67 (see FIG. 3) and the below-described second recessed parts 62, 63 (see FIG. 2).

<Display Case>

As illustrated in FIG. 1, the display panel 20, which is for example a liquid crystal display panel, is incorporated in the display case 12. The display case 12 has a frame shaped front cover 13 and a back cover 15, the front cover 13 covering the outer perimeter of the display panel 20 from the front side, the back cover 15 covering the display panel 20 from the back side. The front surface of the display panel 20 is a display surface 20A for displaying an image or a video and is exposed from the inner side of the front cover 13.

Furthermore, the display case 12 has a notch 19 at the lower end thereof when the display panel 20 is viewed from the front, the notch 19 being notched flat in an inverted U-shape. The below-described second rotation part 34 (see FIG. 12) is disposed in the notch 19. Central position P is defined as the position that is at the center of the display case 12 in the X direction and on the first axis J.

Various texts and graphics are displayed on the display surface 20A according to the arithmetic operations of the above-described CPU. Also, an input device such as a touch panel is disposed on the display panel 20. Various commands and data are inputted from the touch panel to the CPU according to an operation of a stylus pen or a finger of a user, for example. In the subsequent description, the surface of the display case 12 on which the display surface 20A is exposed is referred to as a back surface 12A, and the surface of the display case 12 opposite to the back surface 12A is referred to as a surface 12B.

(First Recessed Part)

As illustrated in FIG. 3, the first recessed part 66 and the first recessed part 67 are formed at the positions in the center in the Y direction and both ends in the X direction of the back surface 12A of the display case 12. The first recessed part 66 is disposed on the left side and the first recessed part 67 is disposed on the right side when viewed with the notch 19 of the display case 12 placed on the back side.

Because the first recessed part 66 and the first recessed part 67 have the same configuration, the first recessed part 67 will be described and description of the first recessed part 66 will not be given. In the present embodiment, as an example, the first recessed part 66 and the first recessed part 67 have the same dimension and shape as the above-described second recessed part 62 and second recessed part 63 (see FIG. 2).

Figure 11:
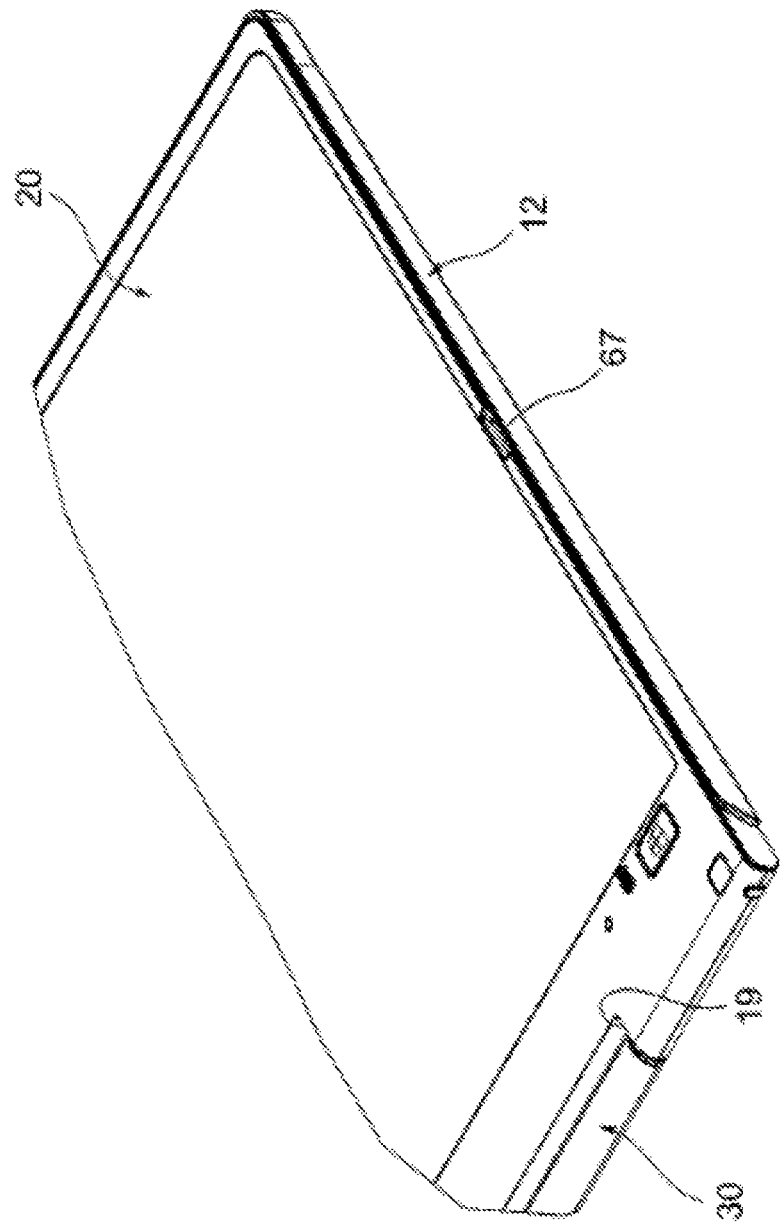
FIG. 11 is an enlarged partial perspective view of the back surface of the display case according to the first embodiment.
Figure 20:
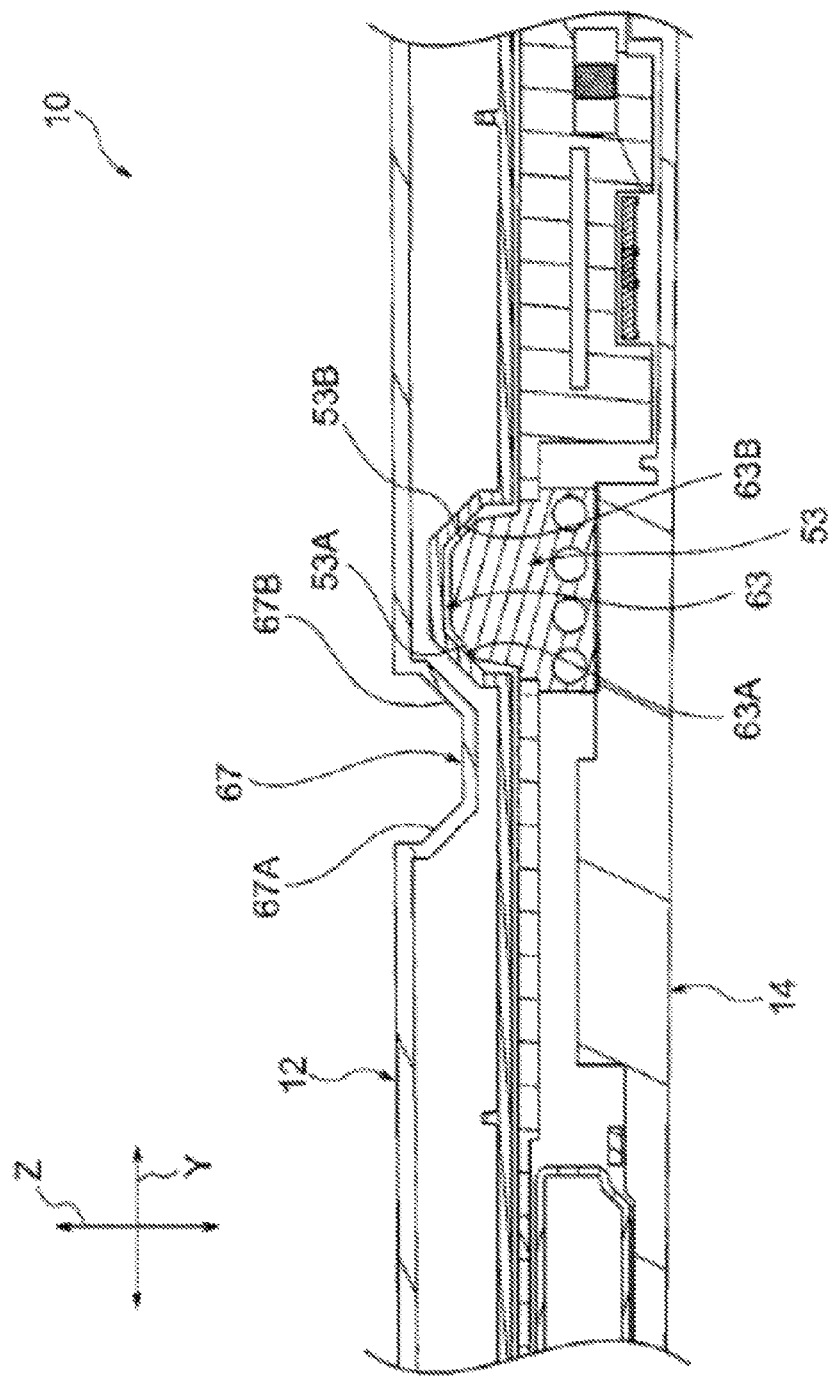
FIG. 20 is an enlarged partial cross-sectional view (cross-section along line C-C of FIG. 3) illustrating the second closed state of the personal computer according to the first embodiment.

The first recessed part 67 is formed in a long closed-end hole shape which is open in the Z direction and has a transverse direction of the X direction and a longitudinal direction of the Y direction (see FIG. 11). As illustrated in FIG. 20, the first recessed part 67 has an inclined surface 67A and an inclined surface 67B which are at both ends in the Y direction and inclined with respect to the Z direction. That is, the first recessed part 67 has a hole wall in an inverted trapezoidal shape when viewed in the X direction.

(Second Recessed Part)

As illustrated in FIG. 2, the second recessed part 62 and second recessed part 63 are formed at the positions nearer to the back side than the center in the Y direction and both ends in the X direction of the surface 12B of the display case 12. The second recessed part 62 is disposed on the left side and the second recessed part 63 is disposed on the right side when viewed with the notch 19 of the display case 12 placed on the back side. Because the second recessed part 62 and the second recessed part 63 have the same configuration, the second recessed part 63 will be described and description of the second recessed part 62 will not be given.

Figure 8:
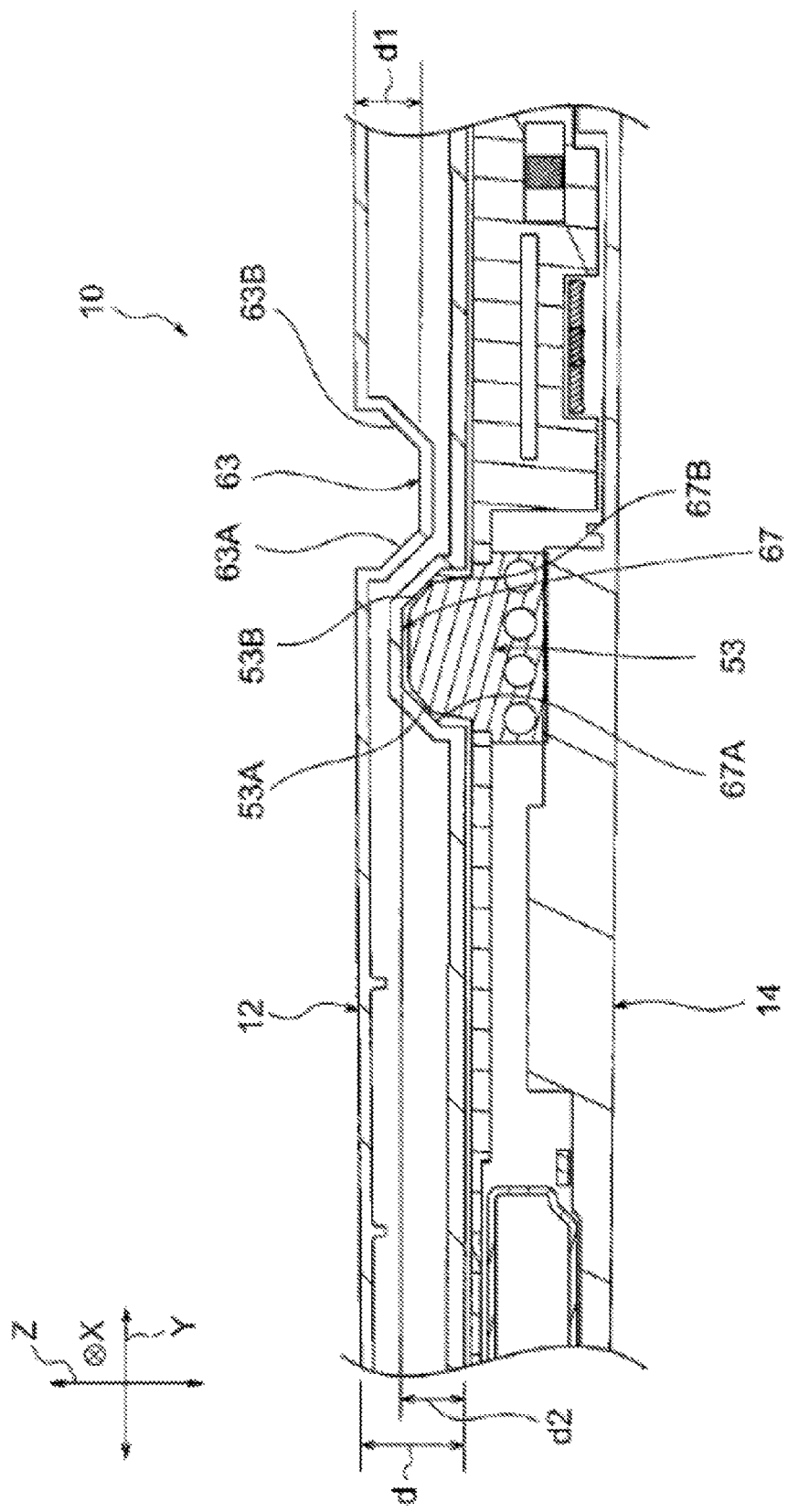
FIG. 8 is an enlarged partial cross-sectional view (cross-section along line C-C of FIG. 2) illustrating the first closed state of the personal computer according to the first embodiment.
Figure 10:
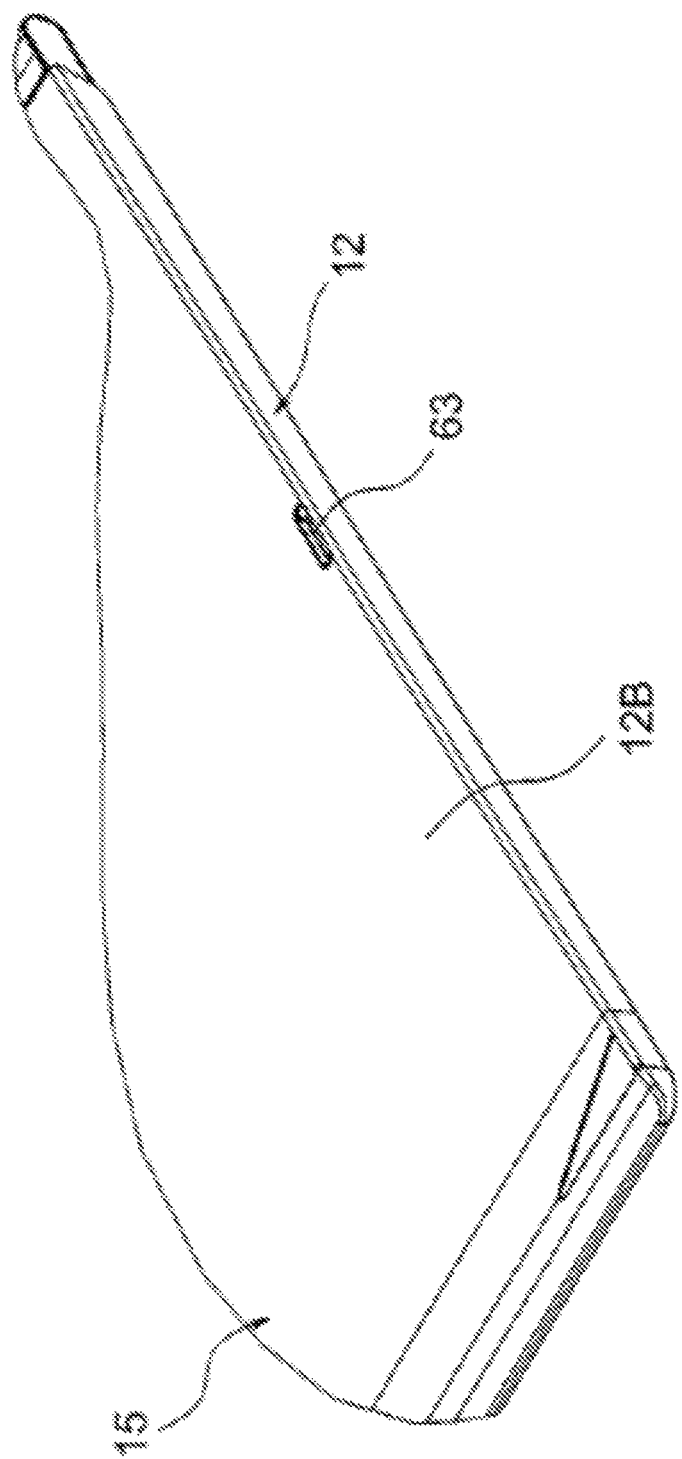
FIG. 10 is an enlarged partial perspective view of the surface of a display case according to the first embodiment.

The second recessed part 63 is formed in a long closed-end hole shape which is open in the Z direction and has a transverse direction of the X direction and a longitudinal direction of the Y direction (see FIG. 10). As illustrated in FIG. 8, the second recessed part 63 has an inclined surface 63A and an inclined surface 63B which are at both ends in the Y direction and inclined with respect to the Z direction. That is, the second recessed part 63 has a hole wall in an inverted trapezoidal shape when viewed in the X direction. Let d be the thickness of the display case 12, d1 be the depth of the second recessed part 63, and d2 be the depth of the first recessed part 67.

Here, in the display case 12, the first recessed part 67 and the second recessed part 63 are open in opposite sides in the Z direction and are disposed with the centers displaced in the Y direction (the direction in which the display case 12 is displaced with respect to the main body case 14). Specifically, the first recessed part 67 and the second recessed part 63 are disposed with the adjacent inclined surface 67B and inclined surface 63A close to each other, and the inclination direction of the inclined surface 67B and the inclination direction of the inclined surface 63A are parallel.

(Antenna)

As illustrated in FIG. 1, the display case 12 stores therein an antenna 24 as an example of a communication unit that performs radio communications.

The antenna 24 is made of metal as an example, and disposed at the upper left of the perimeter of the display panel 20 when the display panel 20 is viewed from the front, and is fixed to the back cover 15. The antenna 24 is electrically connected to the motherboard 25 (see FIG. 5) via a cable 21 (see FIG. 15) for antenna as an example of wiring. The cable 21 for antenna is run from the antenna 24 along the outer perimeter of the display panel 20 in the display case 12, and extends into the main body case 14 through the connector 30.

Figure 6:
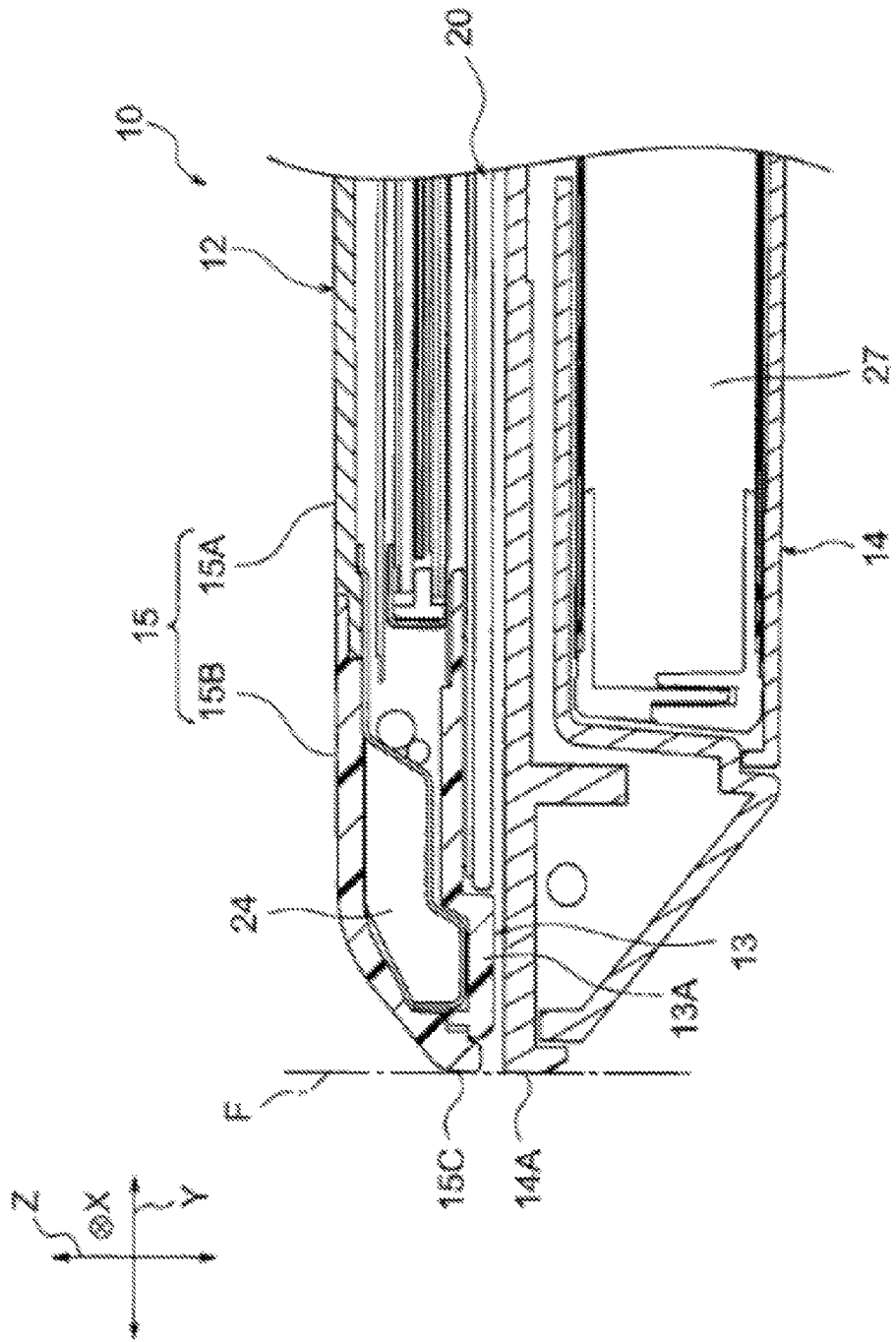
FIG. 6 is an enlarged partial cross-sectional view (cross-section along line A-A of FIG. 2) illustrating the first closed state of the personal computer according to the first embodiment.

As illustrated in FIG. 6, the front cover 13 has a cover member 13A made of resin. The back cover 15 has a cover member 15A and a cover member 15B as an example, the cover member 15A being made of metal, the cover member 15B being made of resin and attached at the end of the cover member 15A. The antenna 24 is interposed between the cover member 13A and the cover member 15B. That is, the antenna 24 is covered by a member made of resin and is capable of performing radio communications with the outside.

<Connector>

Figure 12:
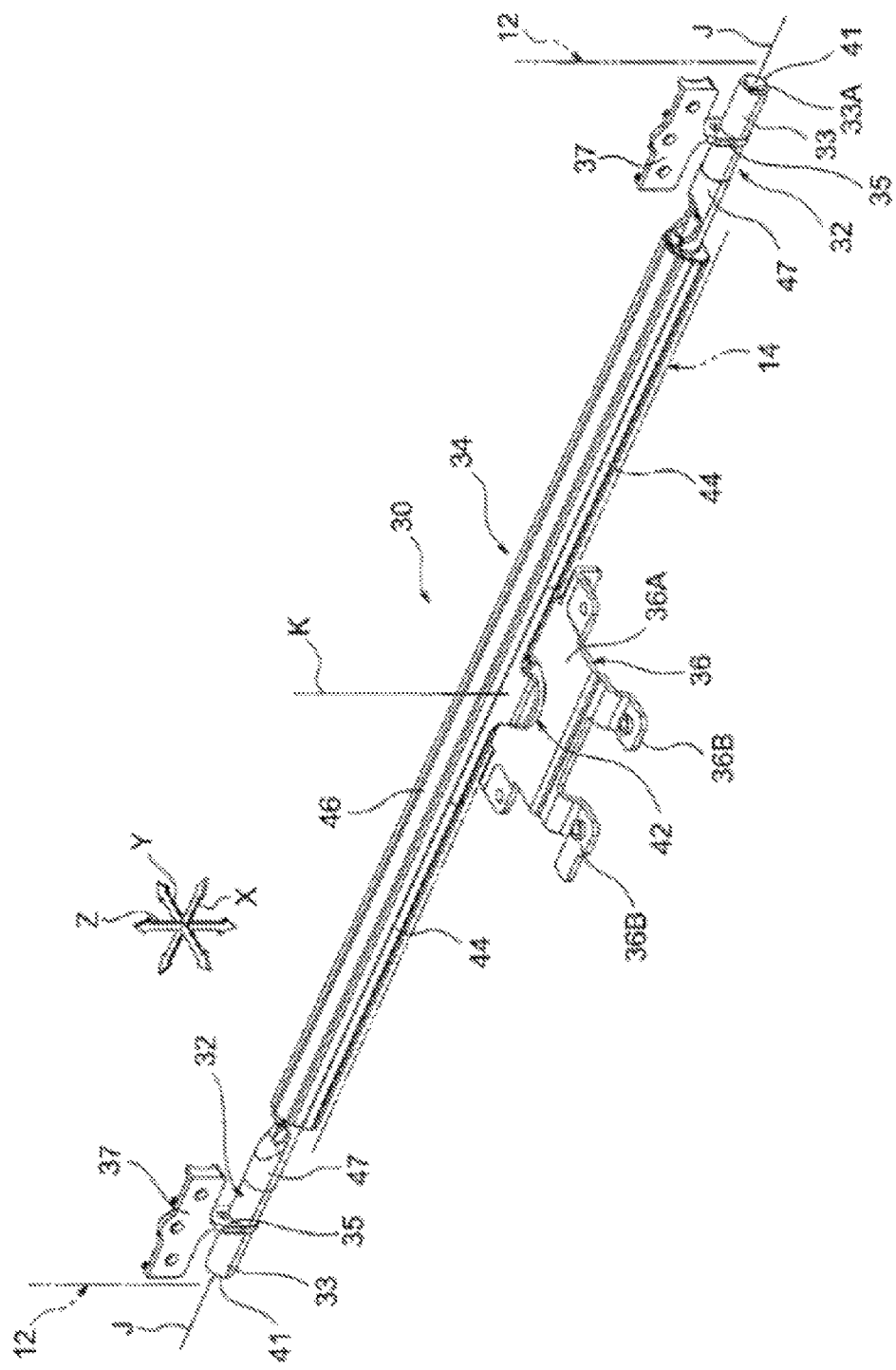
FIG. 12 is a perspective view of a first rotation part and a second rotation part according to the first embodiment.

As illustrated in FIG. 12, the connector 30 has, as an example, two first rotation parts 32 rotatable about the first axis J, a second rotation part 34 that supports the first rotation parts 32 and is rotatable about the second axis K, and a support member 36 that supports the second rotation part 34. The first axis J is a line having an axial direction of the X direction, and the second axis K is a line having an axial direction of the Z direction.

[First Rotation Part]

Figure 14:
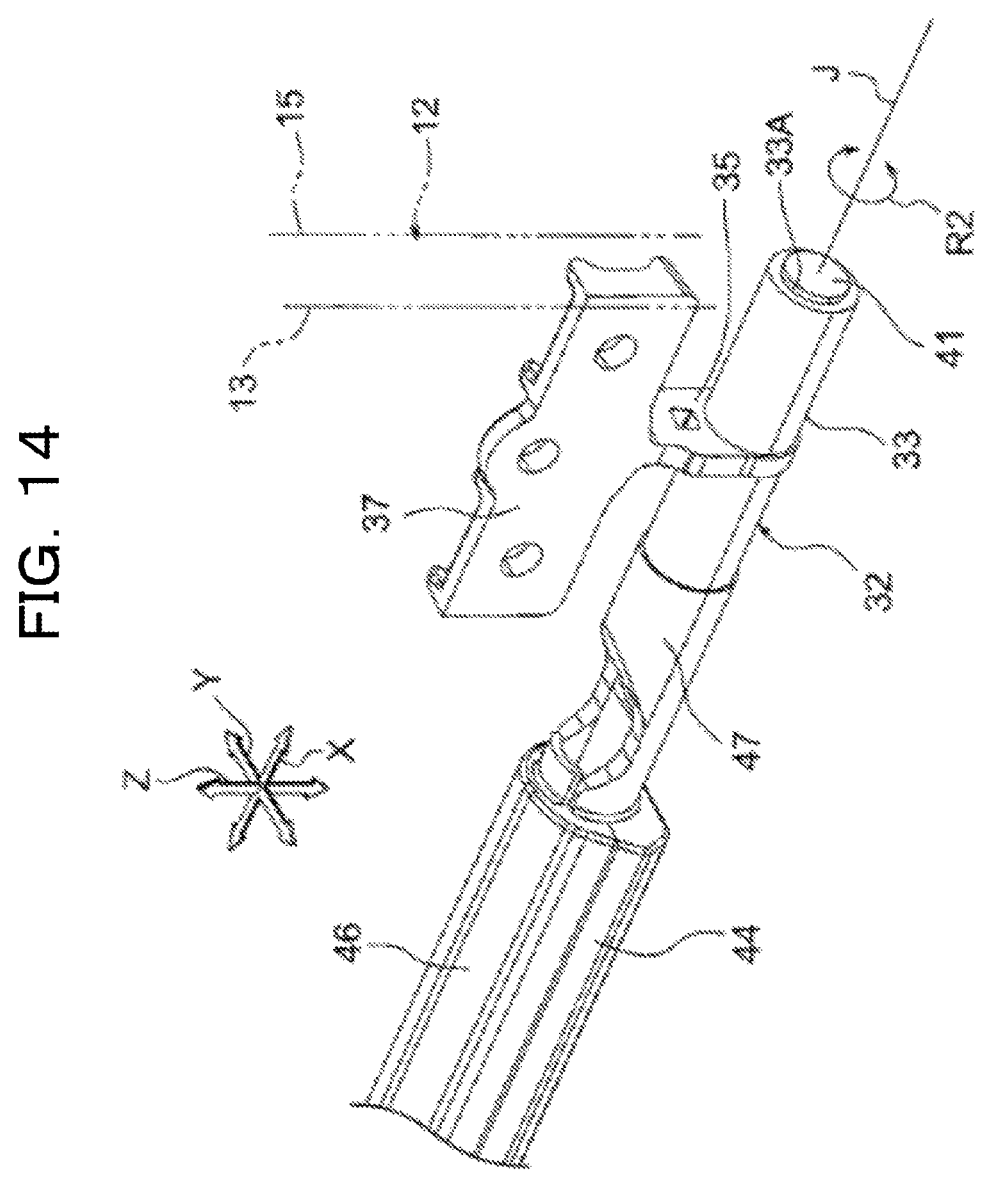

As illustrated in FIG. 14, the first rotation part 32 has an integrally formed shape including a cylindrical tube part 33, a projection part 35, and a tabular mounting part 37, the projection part 35 radially projecting from the center in the X direction of the outer circumferential surface of the tube part 33, the mounting part 37 being formed at the end of the projection part 35 and parallel to the X-Z plane. The first rotation parts 32 are disposed on both sides of the below-described arm 44 in the X direction.

A through hole 33A, which is through in the X direction, is formed in the tube part 33. A shaft 41 attached to the arm 44 is inserted in the through hole 33A, and a locking member such as a C ring (not illustrated) is provided, and thus the tube part 33 is rotatable about the first axis J as the rotation center.

As an example, the mounting part 37 is secured with a screw (not illustrated) to a boss (not illustrated) that stands upright from the inner wall surface of the back cover 15 of the display case 12. That is, the first rotation part 32 is provided in the display case 12. Accordingly, as illustrated in FIG. 1, the display case 12 is rotatable (inclined) about the first axis J with respect to the main body case 14.

[Second Rotation Part]

As illustrated in FIG. 12, the second rotation part 34 has a main body 42, the arm 44, and a cover member 46, the main body 42 being an example of a rotation body, the arm 44 being an example of a projection part, the cover member 46 being an example of a cover member. The second rotation part 34 is provided in the main body case 14 to support the first rotation part 32.

(Main Body)

As illustrated in FIG. 18, the main body 42 has a disk part 42A, an axial part 42B, and an inclined part 42C, the axial part 42B projecting to the lower side from the lower surface of the disk part 42A, the inclined part 42C extending diagonally upward from the upper surface of the disk part 42A. The disk part 42A has the center position which is located on the second axis K. The axial part 42B is formed in a cylindrical shape and is fitted into the below-described through hole 36C of the support member 36 so as to be rotatable about the second axis K as the center. The inclined part 42C is formed in a cylindrical shape and extends diagonally upward in an axial direction of an inclination direction E (indicated by arrow E) which is inclined with an angle of θ with respect to the axial direction (the Z direction) of the second axis K.

The disk part 42A and the inclined part 42C has a through hole 43 from the lower end to the upper end, the through hole 43 being an example of a hole having the axial direction of the arrow E direction. That is, the inside of the axial part 42B and the inside of the through hole 43 communicate with each other. The through hole 43 has a dimension that allows the cable 21 for antenna and another cable 26 (see FIG. 15) to be inserted therethrough. In this manner, the main body 42 has various wires inserted therein and is rotatable about the second axis K as the center in the main body case 14. A cable for camera provided in the display case 12 may be given as an example of the another cable 26 (see FIG. 15).

(Arm)

Figure 13:
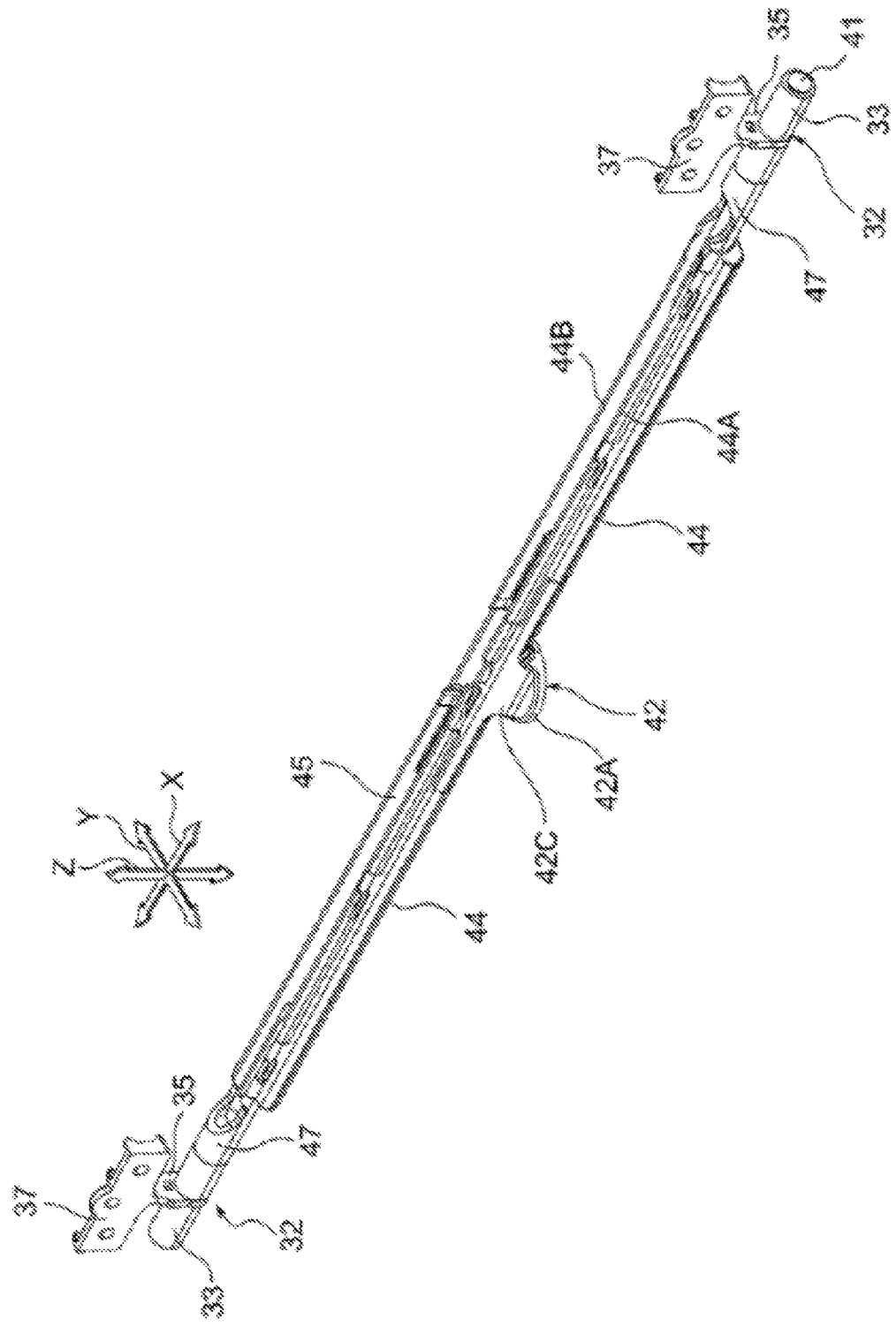
FIG. 13 is a perspective view of the first rotation part and the second rotation part with a cover member removed according to the first embodiment.
Figure 15:
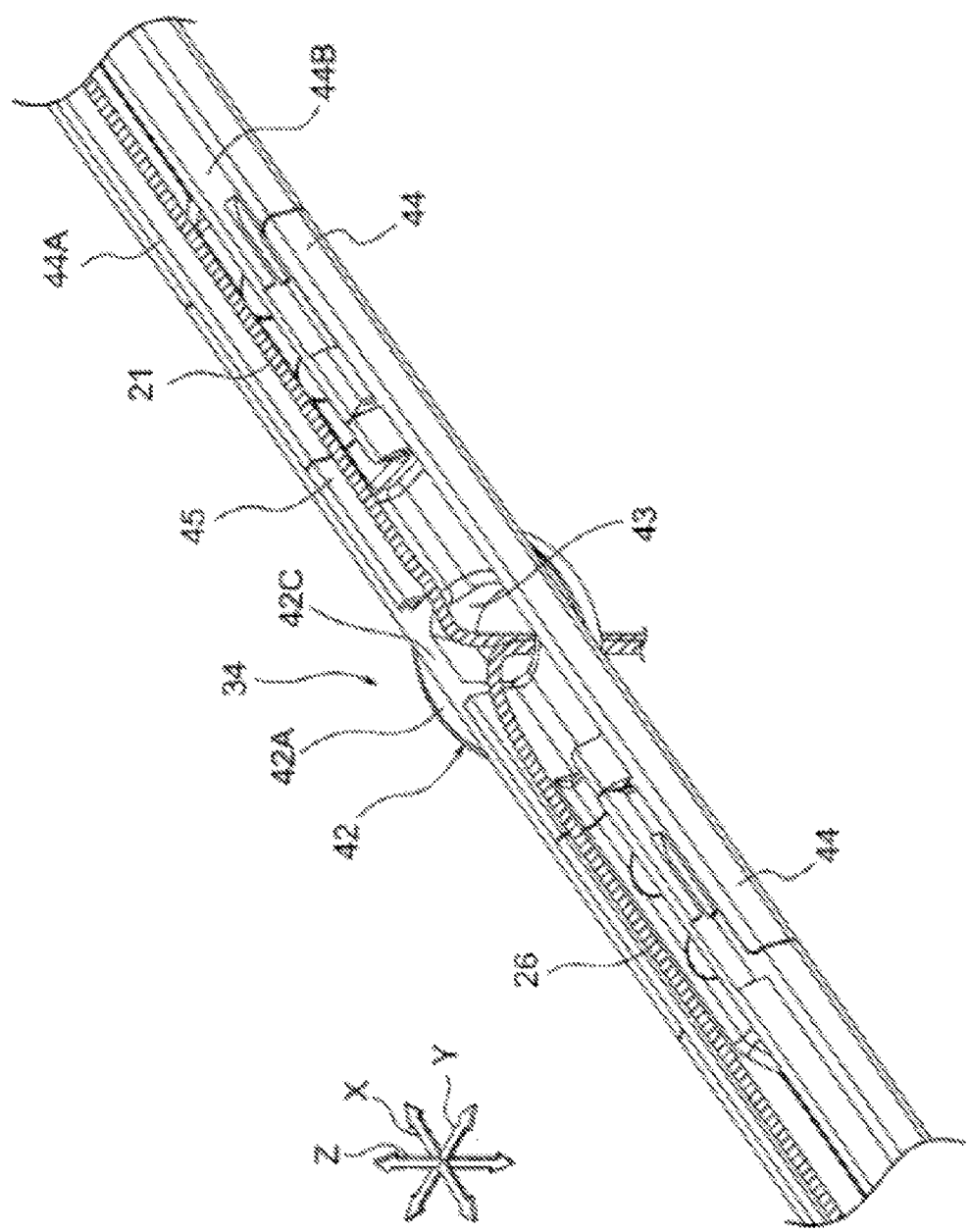
FIG. 15 is an enlarged partial perspective view illustrating the second rotation part according to the first embodiment.

As illustrated in FIGS. 13 and 15, the arm 44 projects from the main body 42 to both sides in the X direction along the edge of the display case 12 (see FIG. 12). The arm 44 is integral with the main body 42 as an example. In addition, the arm 44 has a groove 45 that is open upward in the Z direction and extends in the X direction. As illustrated in FIG. 15, the inside of the through hole 43 and the inside of the groove 45 communicate with each other. The through hole 43 and the groove 45 store therein the cable 21 for antenna and the another cable 26.

In addition, side walls 44A, 44B, which stand upright in the Z direction, are formed in the upper portion of the arm 44. The side walls 44A, 44B have a longitudinal direction of the X direction and face each other with spaced apart in the Y direction. The cover member 46 (see FIG. 12) is fitted into the side walls 44A, 44B.

As illustrated in FIG. 14, cylindrical supporting parts 47 are formed at both ends of the arm 44 in the X direction. The supporting parts 47 are each open to the outer side in the X direction and the shaft 41 is fitted into and fixed to the supporting parts 47. That is, the shaft 41 projects from both ends of the arm 44 in the X direction to the outer side in the X direction, and the first rotation part 32 is rotatable about the shaft 41 as described above.

(Cover Member)

As illustrated in FIGS. 12 and 18, as an example, the cover member 46 is a long member in the X direction and formed to have a Y-Z cross-section of an upward convex arc. Also, a projection (not illustrated), which projects to the inner side, is formed in the cover member 46. The projection is fitted into the side walls 44A, 44B (see FIG. 13) of the arm 44, and the cover member 46 is thereby attached to the arm 44 so as to cover the groove 45 (see FIG. 15).

In addition, as illustrated in FIG. 18, the cover member 46 is symmetrical with respect to the a perpendicular line G intersecting the first axis J and having an axial direction of the Z direction when viewed in the axial direction (the X direction) of the first axis J. Here, the cover member 46 covers the groove 45 (see FIG. 15), thereby suppressing protrusion of the cable 21 for antenna and the another cable 26 (see FIG. 15) from the groove 45 to the outer side.

[Support Member]

As illustrated in FIG. 12, the support member 36 includes a tabular part 36A and a fastening part 36B, the tabular part 36A having a planar area parallel to the X-Y plane, the fastening part 36B being bent like a crank at the periphery of the tabular part 36A. As illustrated in FIG. 18, the center of the tabular part 36A has a through hole 36C which is through in the Z direction, and the axial part 42B of the main body 42 is fitted into the through hole 36C as described above. The support member 36 is fixed into the main body case 14 by the fastening part 36B (see FIG. 12) which is fastened to the inner wall surface of the main body case 14 with a screw (not illustrated).

(Disposition of First Axis and Second Axis)

As described above, the first axis J is, as one example, a line having the axial direction of the X direction. As illustrated in FIG. 18, the first axis J is depicted as point J on the Y-Z plane. In addition, the first axis J is the rotation center of the first rotation part 32 (see FIG. 14).

On the other hand, the second axis K is, as one example, a line having the axial direction of the Z direction. In addition, the second axis K is the rotation center of the second rotation part 34.

Here, the second axis K is located at a point displaced by a distance L toward the front side from the central position P (see FIG. 1) of the display case 12 in the axial direction (the X direction) of the first axis J, and has a different axial direction (the Z direction) from the first axis J. That is, the second axis K is displaced from the first axis J.

Figure 19:
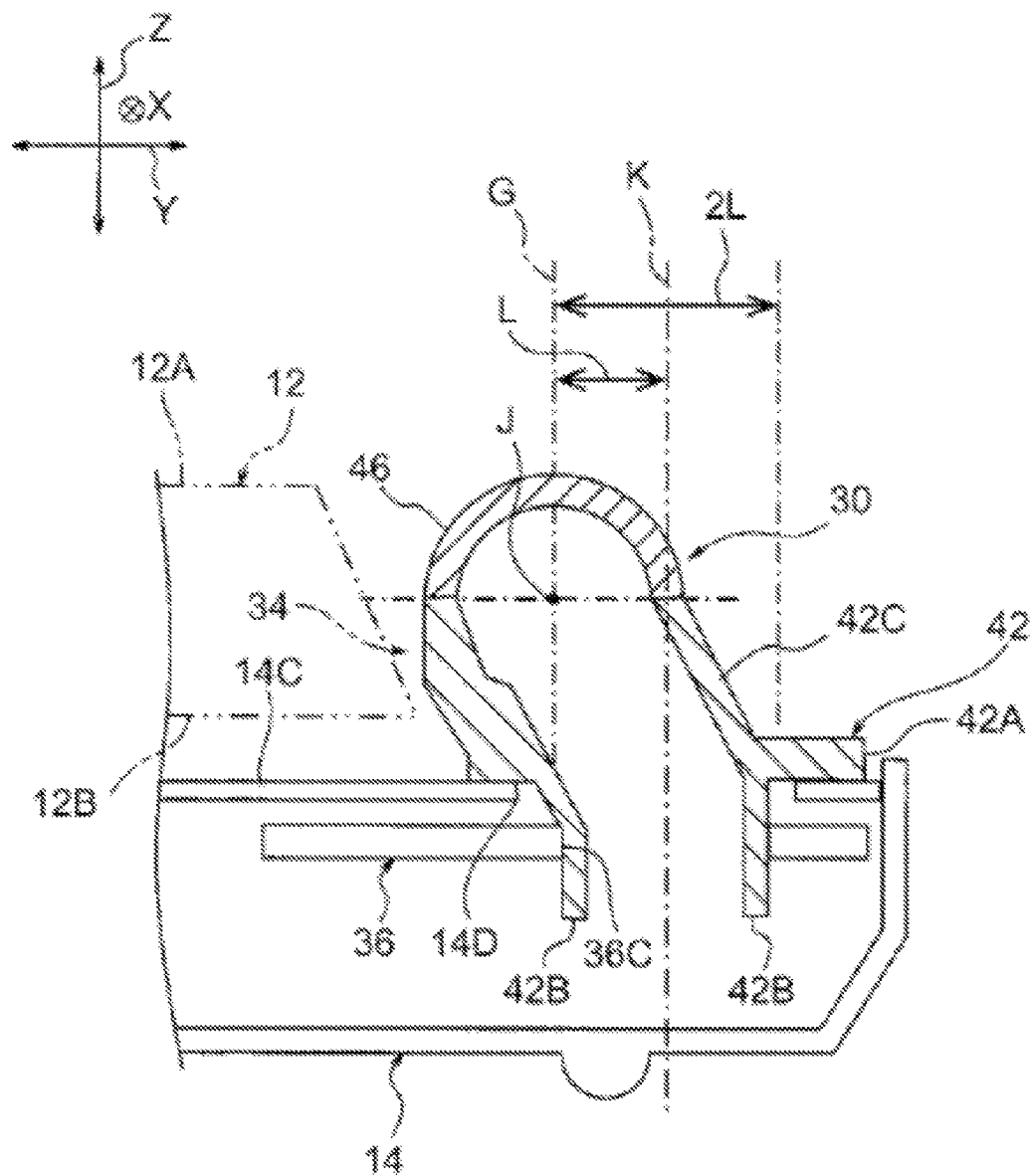
FIG. 19 is a schematic diagram illustrating a cross-sectional view (cross-section along line B-B of FIG. 2) of the second rotation part of the personal computer in the second closed state according to the first embodiment.

For this reason, as illustrated in FIG. 19, when the display case 12 is rotated for 180° about the second axis K as the center and is set in the second closed state, the first axis J is displaced from the second axis K by the distance L toward the front side (the left side in FIG. 19) in the Y direction. That is, when the disposition of the display case 12 is changed from the first closed state to the second closed state, the position of the first axis J in the Y direction is displaced from the back side to the front side in the Y direction by a distance of 2 L.

Figure 22:
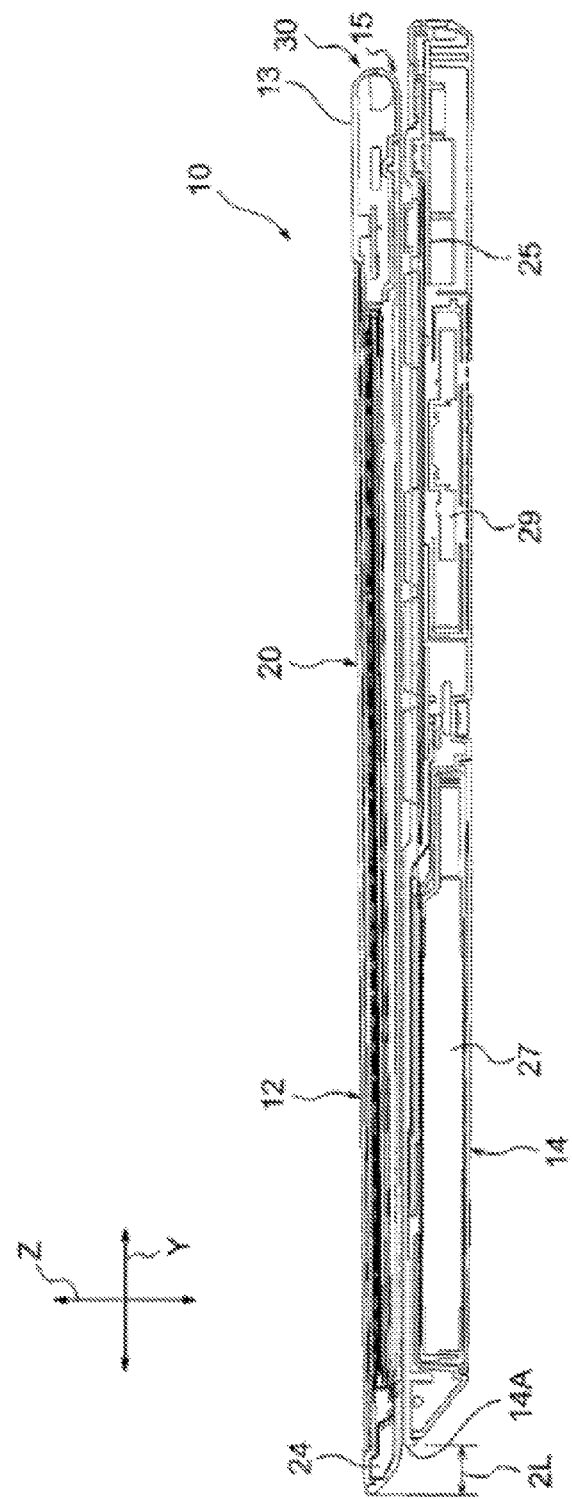
FIG. 22 is a vertical cross-sectional view (cross-section along line D-D of FIG. 3) illustrating the second closed state of the personal computer according to the first embodiment.
Figure 23:
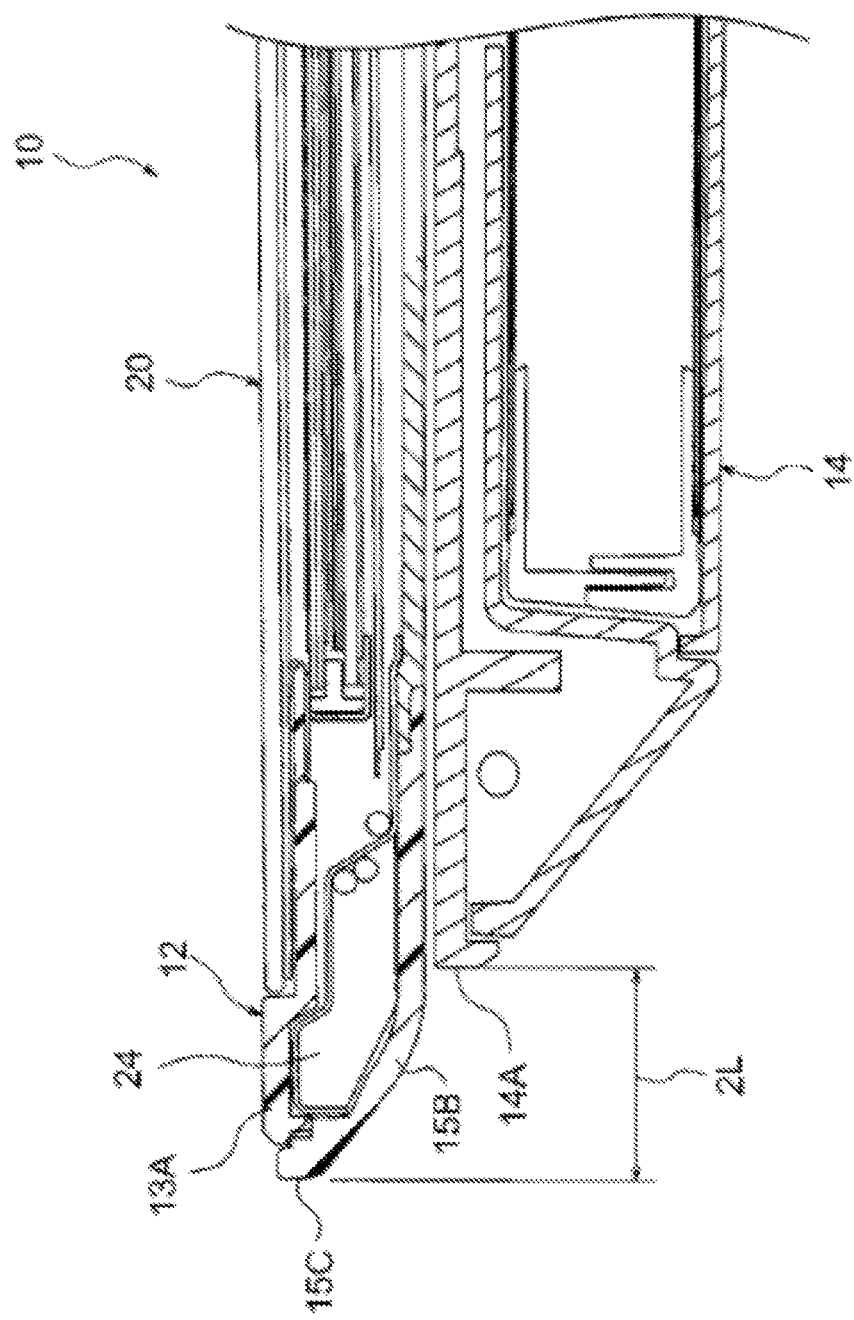
FIG. 23 is an enlarged partial cross-sectional view illustrating the second closed state of the personal computer according to the first embodiment.

As illustrated in FIGS. 22 and 23, the distance 2 L is the length by which at least part of the antenna 24 in the display case 12 projects from an end face 14A on the front side (the left side in FIGS. 22 and 23) of the main body case 14 toward the outer side (the front side) in the Y direction.

Figure 16:
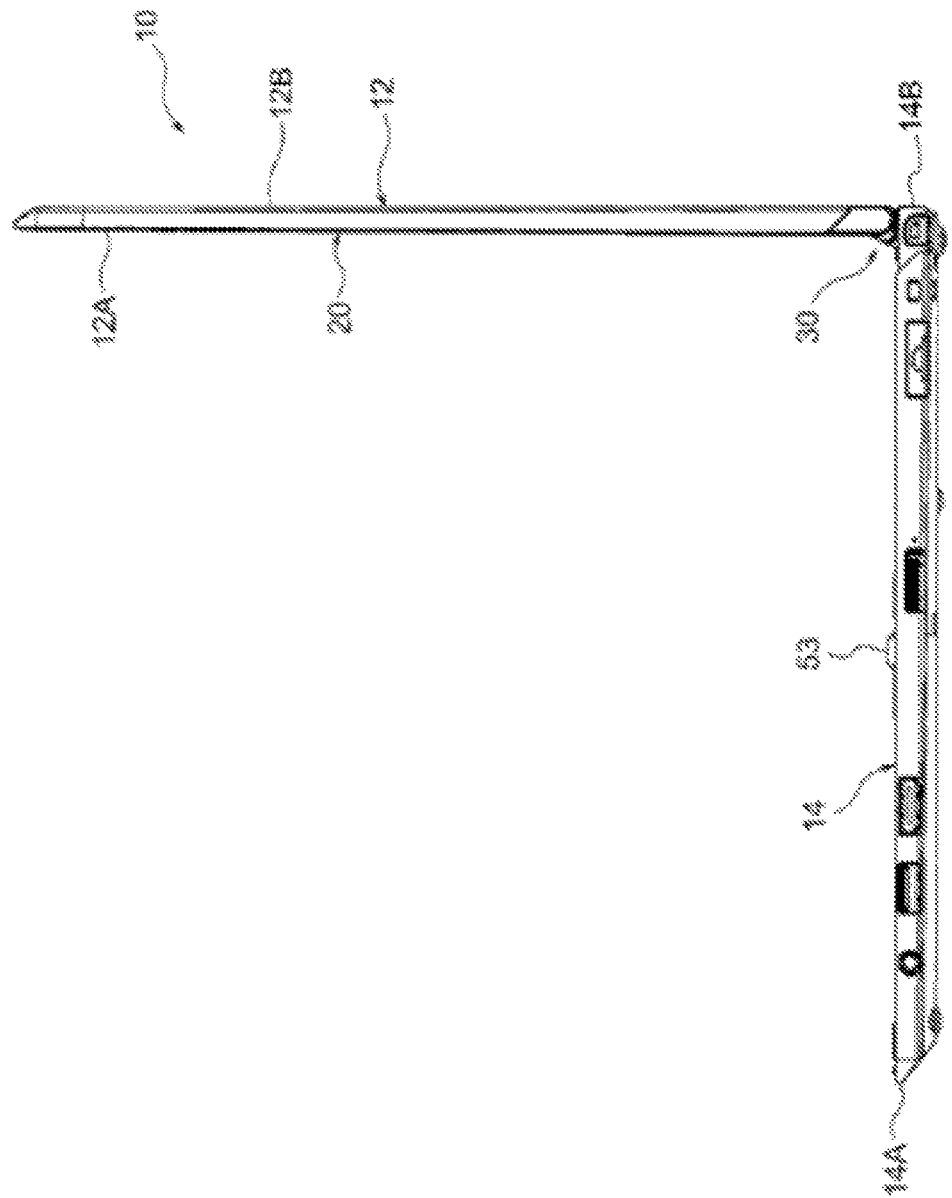
FIG. 16 is a side view of the personal computer in the open state according to the first embodiment.
Figure 17:
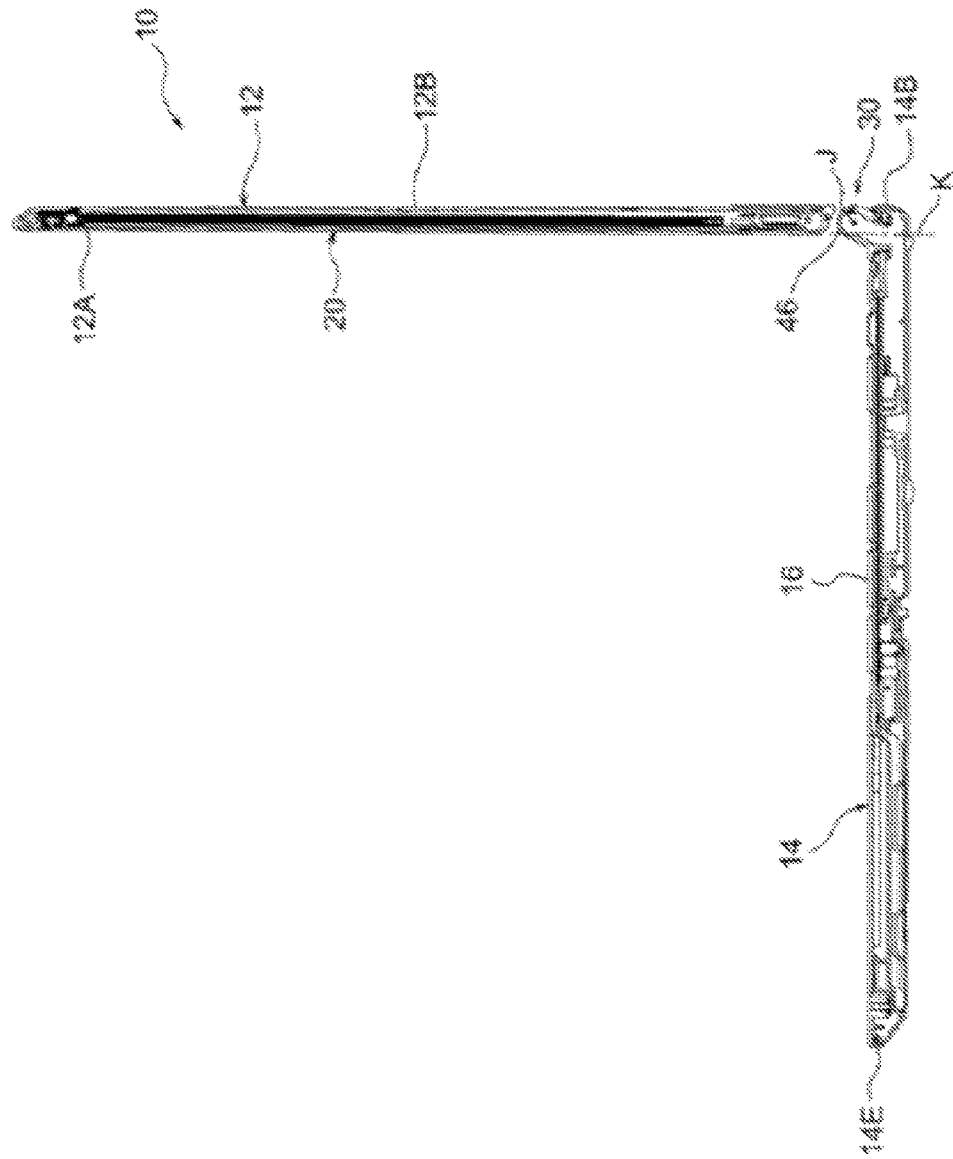
FIG. 17 is a vertical cross-sectional view of the personal computer in the open state according to the first embodiment.

As illustrated in FIGS. 16 and 17, in the open state of the personal computer 10, the disposition of the display case 12 with respect to the main body case 14 is defined so that the end face 14B (the end face on the back side in the Y direction) of the main body case 14 and the surface 12B of the display case 12 are aligned with each other. As illustrated in FIG. 17, in the open state, the first axis J is disposed nearer to the back side (the right side in FIG. 17) in the Y direction than the second axis K.

As illustrated in FIG. 6, in the first closed state of the personal computer 10, an end face 15C of the display case 12 on the front side in the Y direction and the end face 14A of the main body case 14 on the front side in the Y direction are aligned with each other on a plane F parallel to the X-Z plane. As illustrated in FIGS. 1 and 7, the main body case 14 has a depression 14E into which a user places a finger for moving the display case 12 upward. For this reason, the end face 15C and the end face 14A (see FIG. 6) except the portion of the depression 14E are aligned with each other on the plane F.

Next, a comparative example will be described.

Figure 26:
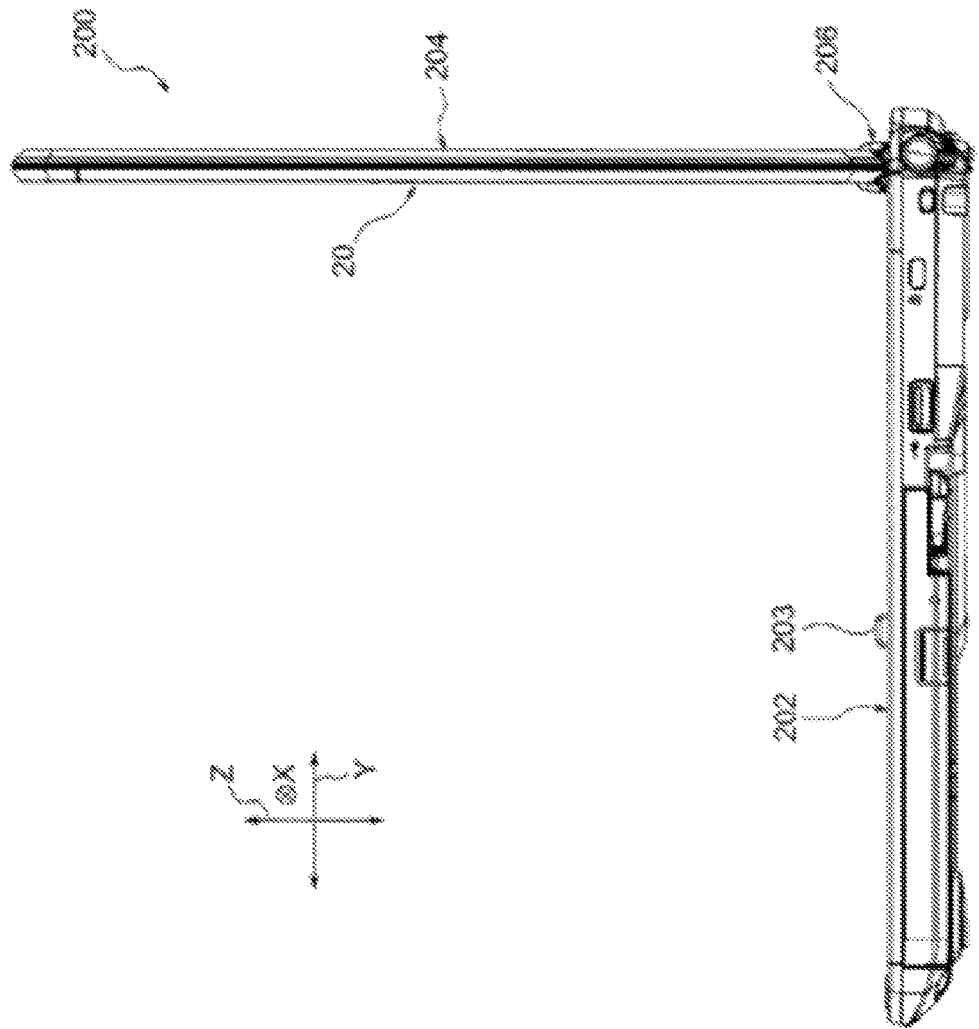
FIG. 26 is a right side view illustrating an open state of a personal computer according to a comparative example.

FIG. 26 illustrates a notebook personal computer 200 as a comparative example. The personal computer 200 has a main body case 202, a display case 204, and a connector 206, the display case 204 being to be opened or closed around a center on the back side of the main body case 202 in the Y direction, the connector 206 connecting the main body case 202 and the display case 204. The open state is defined as the state in which the display case 204 is disposed at an angle of 90° with respect to the main body case 202.

The main body case 202 includes a projection part 203 that projects upward in the Z direction from the upper surface. The main body case 202 is made of metal. In addition, the main body case 202 projects from the connector 206 toward the back side in the Y direction. The reason why the main body case 202 projects from the connector 206 toward the back side in the Y direction is that the width of the connector 206 in the Y direction is greater than the width (thickness) of the display case 204 in the Y direction and the display case 204 is located on the below-described second axis K (see FIG. 27).

Figure 28:
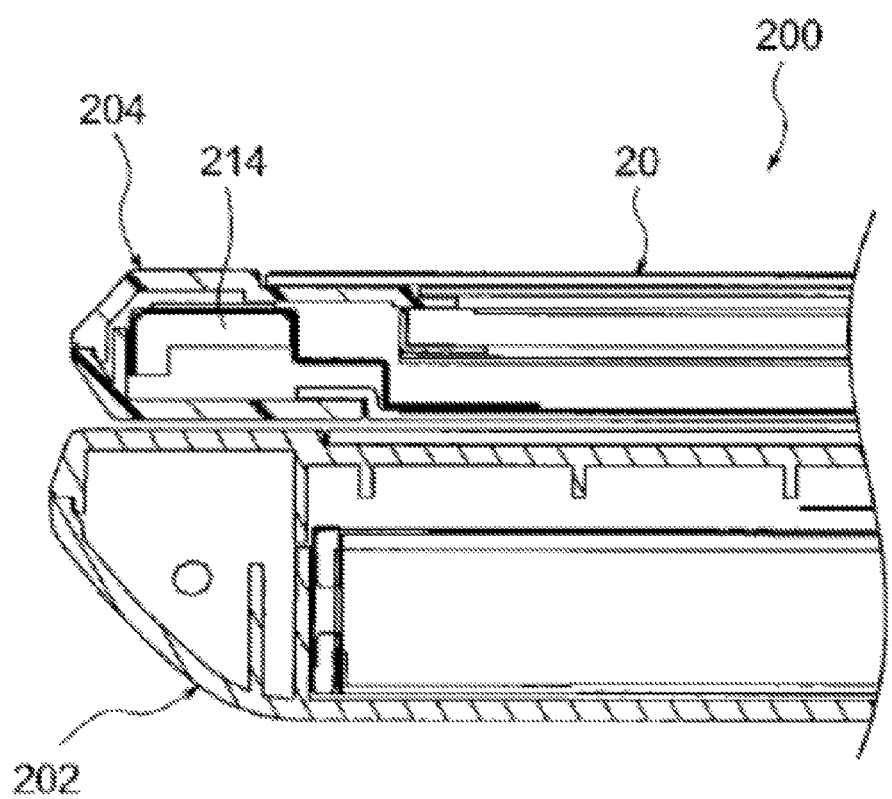
FIG. 28 is an enlarged partial cross-sectional view illustrating a second closed state of the personal computer according to the comparative example.

As illustrated in FIG. 28, the display case 204 has the display panel 20 and a metal antenna 214 provided on the perimeter of the display case 204. In the display case 204, the antenna 214 is covered by a member made of resin. In the display case 204, in the second closed state in which the display panel 20 is disposed facing upward, the portion which covers the antenna 214 is disposed above the main body case 202. The first closed state is the state in which the display panel 20 is disposed facing downward.

As illustrated in FIG. 29, the display case 204 includes a first recessed part 204A into which the projection part 203 is inserted in the first closed state and a second recessed part 204B into which the projection part 203 is inserted in the second closed state. Let d be the thickness of the display case 204, d3 be the depth of the first recessed part 204A, and d4 be the depth of the second recessed part 204B, then (d3+d4)<d. As one example, d3=d4 is assumed.

Figure 27:
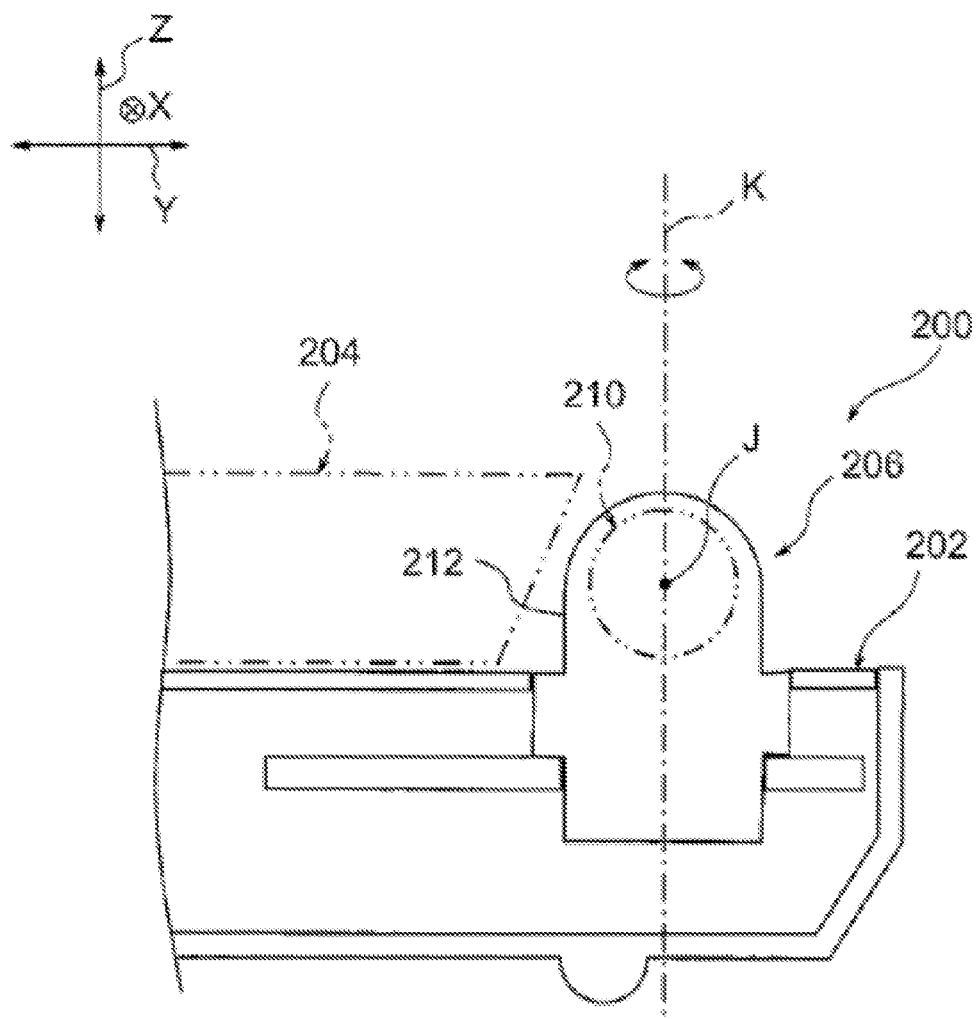
FIG. 27 is a schematic diagram of a first rotation part and a second rotation part of the personal computer according to the comparative example.

As illustrated in FIG. 27, the connector 206 has a first rotation part 210 and a second rotation part 212 that supports the first rotation part 210. The first rotation part 210 is provided in the display case 204 and is rotatable about the first axis J as the center having an axial direction of the X direction. The second rotation part 212 is provided in the main body case 202 and is rotatable about the second axis K as the center having an axial direction of the Z direction. Here, the second axis K intersects the first axis J at the central position of the first axis J in the X direction.

Here, in the personal computer 200 of the comparative example, the second axis K is located on the first axis J. For this reason, even when the second rotation part 212 is rotated for 180° about the second axis K as the rotation center, the position of the first axis J (the first rotation part 210) in the Y direction does not change. Consequently, as illustrated in FIG. 28, the antenna 214 is disposed above the main body case 202 not only in the first closed state but also in the second closed state. In the personal computer 200 of the comparative example, the main body case 202 is made of metal, and so radio waves may be blocked by the main body case 202 and the receiving sensitivity (communication performance) of the antenna 214 may be reduced.

Also, as illustrated in FIG. 29, in the personal computer 200 of the comparative example, the position of the display case 204 in the Y direction with respect to the main body case 202 does not change in both the first closed state and the second closed state. Therefore, the first recessed part 204A and the second recessed part 204B are formed at the same position in the X direction and the Y direction, and thus the depth d3=d4<(d/2). That is, in the personal computer 200 of the comparative example, it is difficult to make the depth of the first recessed part 204A and the second recessed part 204B with respect to the projection part 203 deeper than d/2. For this reason, it is difficult to maintain the contact condition between the projection part 203 and the first recessed part 204A and the contact condition between the projection part 203 and the second recessed part 204B (the contact is likely to be misaligned).

In addition, as illustrated in FIG. 26, in the open state of the personal computer 200 of the comparative example, the main body case 202 projects from the connector 206 toward the back side in the Y direction. For this reason, when a user manipulates the personal computer 200 in a narrow space, the projection part not only interferes with the space but also gives poor appearance.

Next, the operation and effect of the first embodiment will be described.

(Open State)

As illustrated in FIGS. 16 and 17, when the personal computer 10 is in the open state in which the display case 12 extends in the Z direction through the end of the main body case 14 in the Y direction, the end face 14B of the main body case 14 and the surface 12B of the display case 12 are aligned with each other. This is because the first axis J is displaced nearer to the back side in the Y direction than the second axis K as illustrated in FIG. 17, and the display case 12 is located at the end of the main body case 14. In this manner, the end face 14B of the main body case 14 and the surface 12B of the display case 12 are aligned with each other, and thus the personal computer 10 has better appearance compared with the comparative example (the personal computer 200 (see FIG. 26)) described above.

(First Closed State)

When the display case 12 is inclined with an angle 90° toward the front side in the Y direction in the open state illustrated in FIG. 1, the projection part 53 of the main body case 14 is inserted into the first recessed part 67 as illustrated in FIG. 8. Similarly, the projection part 52 (see FIG. 1) is inserted into the first recessed part 66 (see FIG. 3). It is to be noted that because the projection part 53 (as well as the projection part 52) has the tapered surfaces 53A, 53B, the inner wall surface of the first recessed part 67 is not likely to be damaged compared with a projection part having a corner. In this manner, as illustrated in FIGS. 2 and 5, the display case 12 is placed over the main body case 14 in the Z direction, and thus the first closed state is assumed.

Here, as illustrated in FIG. 8, the height of the projection part 53 and the depth d2 of the first recessed part 67 are greater than half the thickness d of the display case 12, and thus the contact (engagement) between the projection part 53 and the first recessed part 67 may be increased compared with the comparative example. Similarly, the contact (engagement) between the projection part 52 (see FIG. 1) and the first recessed part 66 (see FIG. 3) may also be increased. With these effects, in the personal computer 10, it is possible to avoid displacement (not only displacement in a direction but also displacement in a rotational direction is included) of the display case 12 with respect to the main body case 14 in the X-Y plane.

As illustrated in FIG. 6, in the first closed state of the personal computer 10, the end face 15C of the display case 12 on the front side in the Y direction and the end face 14A of the main body case 14 on the front side in the Y direction are aligned with each other. Consequently, the personal computer 10 has reduced space desired for placing itself compared with a personal computer in which the end face 15C and the end face 14A are not aligned in the first closed state.

(Second Closed State)

In the personal computer 10, the disposition of the display case 12 is changed from the first closed state illustrated in FIG. 2 to the open state illustrated in FIG. 1. At this point, as illustrated in FIG. 17, the first axis J is located nearer to the back side in the Y direction than the second axis K.

Figure 21:
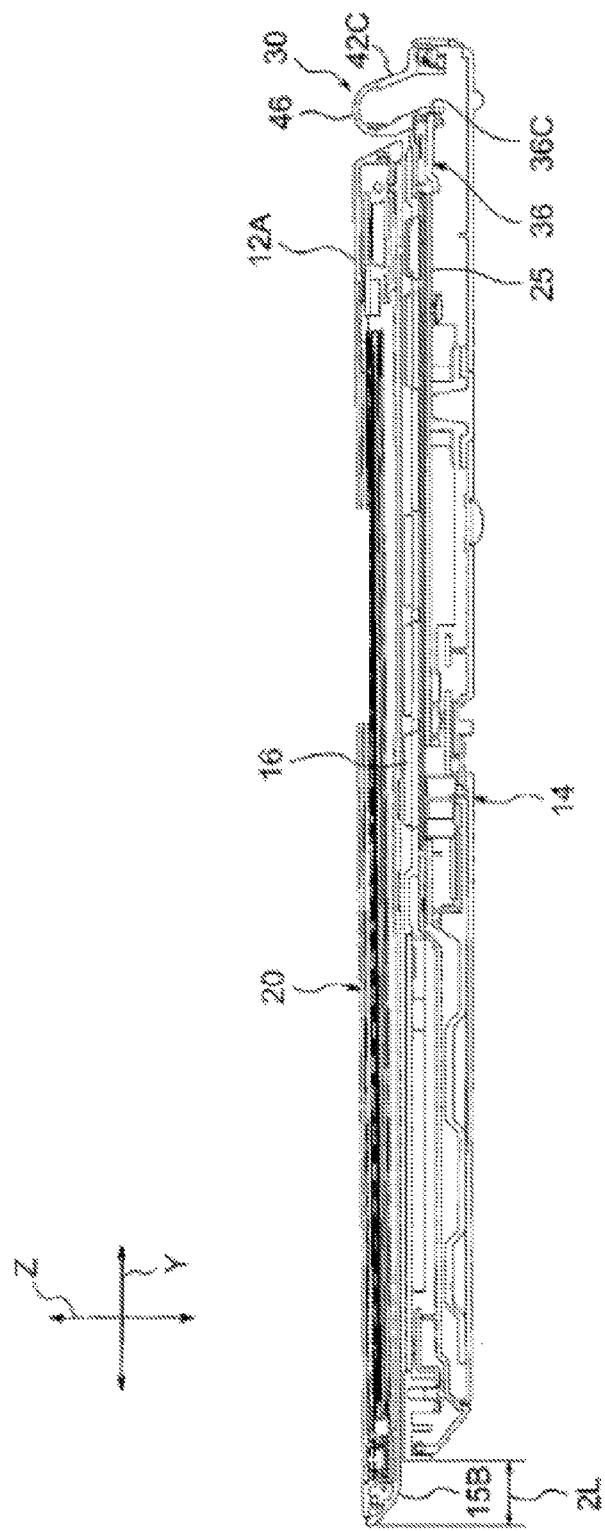
FIG. 21 is a vertical cross-sectional view (cross-section along line B-B of FIG. 3) illustrating the second closed state of the personal computer according to the first embodiment.

Subsequently, when the display case 12 is rotated for 180° about the second axis K as the center (the surface 12B and the back surface 12A are reversed), the first axis J is moved (displaced) from the original position by a distance of 2 L in the Y direction as illustrated in FIG. 19. When the display case 12 is inclined with an angle 90° toward the front side in the Y direction in this state, the projection part 53 of the main body case 14 is inserted into the second recessed part 63 as illustrated in FIG. 20. Similarly, the projection part 52 (see FIG. 1) is inserted into the second recessed part 62 (see FIG. 2). It is to be noted that because the projection part 53 (as well as the projection part 52) has the tapered surfaces 53A, 53B, the inner wall surface of the second recessed part 63 is not likely to be damaged compared with a projection part having a corner. In this manner, as illustrated in FIGS. 3, 21, and 22, the display case 12 is placed over the main body case 14 in the Z direction, and thus the second closed state is assumed.

Here, in the personal computer 10, as illustrated in FIG. 23, the end face 15C of the display case 12 on the front side in the Y direction projects toward the outer side (the front side) from the end face 14A of the main body case 14 on the front side in the Y direction by a distance of 2 L. Thus, at least part of the antenna 24 projects from the main body case 14 toward the outer side in the Y direction. The portion of the display case 12 projecting from the main body case 14 toward the outer side in the Y direction is made of resin. That is, the antenna 24 projecting from the main body case 14 toward the outer side in the Y direction is covered by the resin cover member 13A and the resin cover member 15B. For this reason, in the personal computer 10, blocking of radio waves by the main body case 14 is reduced, decrease in the receiving sensitivity is reduced compared with the comparative example, and thus decrease in the communication performance at the time of use of radio communication may be reduced.

In the personal computer 10, as illustrated in FIG. 8, the height of the projection part 53 and the depth d1 of the second recessed part 63 are greater than half the thickness d of the display case 12. For this reason, in the personal computer 10, the contact (engagement) between the projection part 53 and the second recessed part 63 may be increased compared with the comparative example. Similarly, in the personal computer 10, the contact (engagement) between the projection part 52 (see FIG. 1) and the second recessed part 62 (see FIG. 2) may also be increased. With these effects, in the personal computer 10, it is possible to avoid displacement (not only displacement in a direction but also displacement in a rotational direction is included) of the display case 12 with respect to the main body case 14 in the X-Y plane.

In addition, in the personal computer 10, the inclination directions of the adjacent inclined surface 63A and inclined surface 67B are parallel as illustrated in FIG. 20, and thus the second recessed part 63 and the first recessed part 67 may be closely disposed to each other in the Y direction. Consequently, even when the amount of displacement in the Y direction between the display case 12 and the main body case 14 is small, the displacement for causing the antenna 24 (see FIG. 23) to project with respect to the main body case 14, the depths of the second recessed part 63 and the first recessed part 67 may be deepened so that the contact state (engagement state) with the projection part 53 may be maintained.

In addition, in the personal computer 10, as illustrated in FIG. 12, the second rotation part 34 has the arm 44 that extends from the main body 42 along the edge of the display case 12. Consequently, the supporting range is widened compared with a personal computer in which the display case 12 is supported on a single point, and thus the position of the display case 12 may be stabilized.

Also, as illustrated in FIG. 15, in the personal computer 10, the inside of the through hole 43 of the second rotation part 34 and the inside of the groove 45 communicate with each other, and thus the cable 21 for antenna may be passed through the inside of the second rotation part 34. In addition, in the personal computer 10, the groove 45 is covered by the cover member 46 (see FIG. 12). Therefore, various wires connecting the main body case 14 and the display case 12 (see FIG. 1) are not exposed to the outside of the second rotation part 34.

In addition, in the personal computer 10, as illustrated in FIG. 18, the through hole 43 of the second rotation part 34 is formed in the inclination direction (the arrow E direction) which is inclined with respect to the second axis K. Consequently, the length used for running various wires may be reduced compared with a personal computer in which a through hole having an L-shaped cross-section is formed in the second rotation part 34.

Also, in the personal computer 10, as illustrated in FIG. 18, the cross-sectional shape of the cover member 46 is symmetrical on the right and left when viewed in the axial direction of the first axis J. Therefore, the second rotation part 34 may have the same appearance in the first closed state and the second closed state.

Furthermore, when the personal computer 10 is in a state (open state) in which the display case 12 extends in the Z direction through the end of the main body case 14 as illustrated in FIG. 1, the application buttons 50 (see FIG. 9) are covered by the display case 12. On the other hand, when the back surface 12A of the display case 12 is reversed to the surface side and is placed over the main body case 14 as illustrated in FIG. 4, the application buttons 50 are exposed and operable by a user. In this manner, a user does not recognize the presence of the application buttons 50 in the open state, and the appearance of the personal computer 10 may be improved.

In addition, in the personal computer 10, as illustrated in FIG. 23, the antenna 24 is disposed outside the main body case 14 at the time of use of the display panel 20, and thus the material of the main body case 14 is not necessarily resin. That is, the main body case 14 may be made of metal in the personal computer 10. Consequently, in the personal computer 10, the strength may be ensured and the thickness may be reduced compared with a personal computer in which the main body case 14 is made of resin. In addition, because the entire main body case 14 may be made of metal in the personal computer 10, the cost may be reduced compared with a personal computer in which the main body case 14 is formed of a resin member and a metal member.

Second Embodiment

Next, a second embodiment of the technology disclosed in the present application will be described.

The notebook personal computer 100 as an example of an information processing device according to a second embodiment illustrated in FIGS. 24 and 25 differs from the above-described personal computer 10 (see FIG. 1) according to the first embodiment in the following modified configuration. In the second embodiment, the same components as in the above-described first embodiment are denoted by the same symbols and a description thereof is not given.

Figure 24:
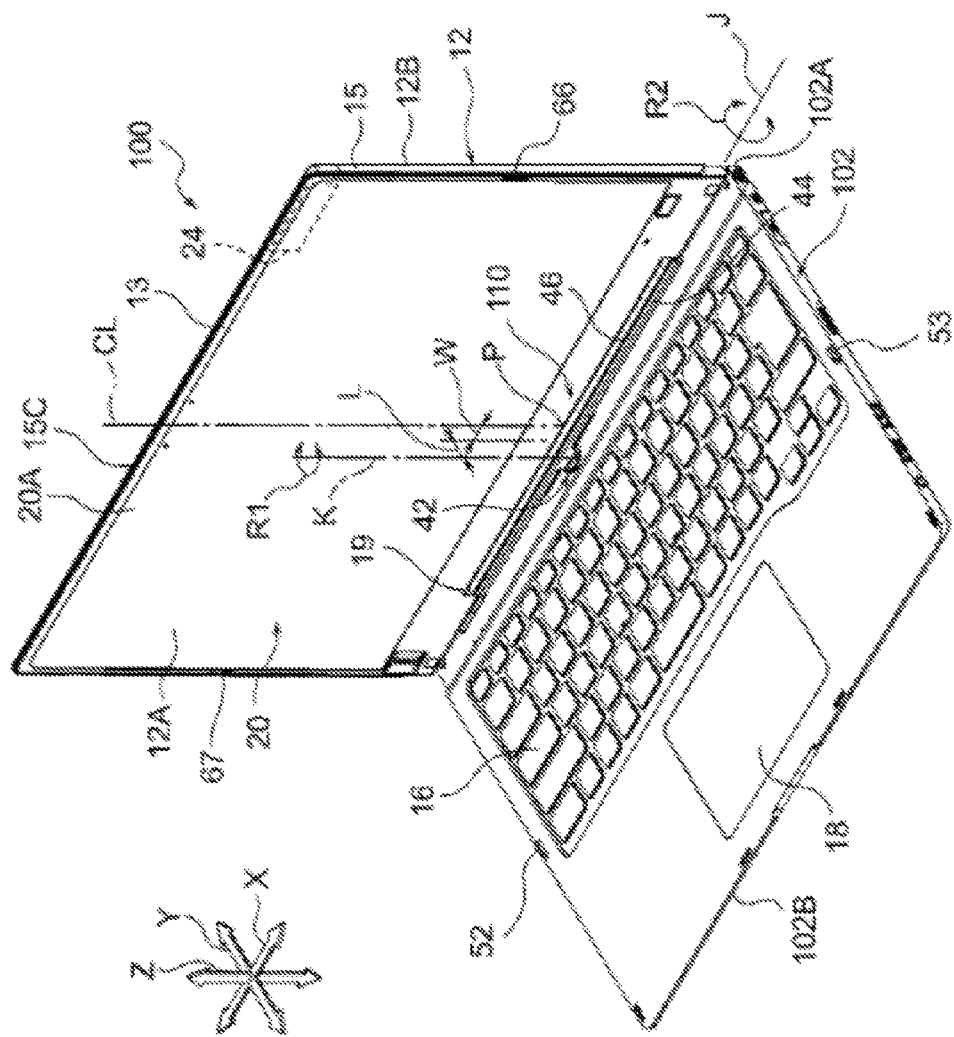
FIG. 24 is a perspective view illustrating an open state of a personal computer according to a second embodiment.
Figure 25:
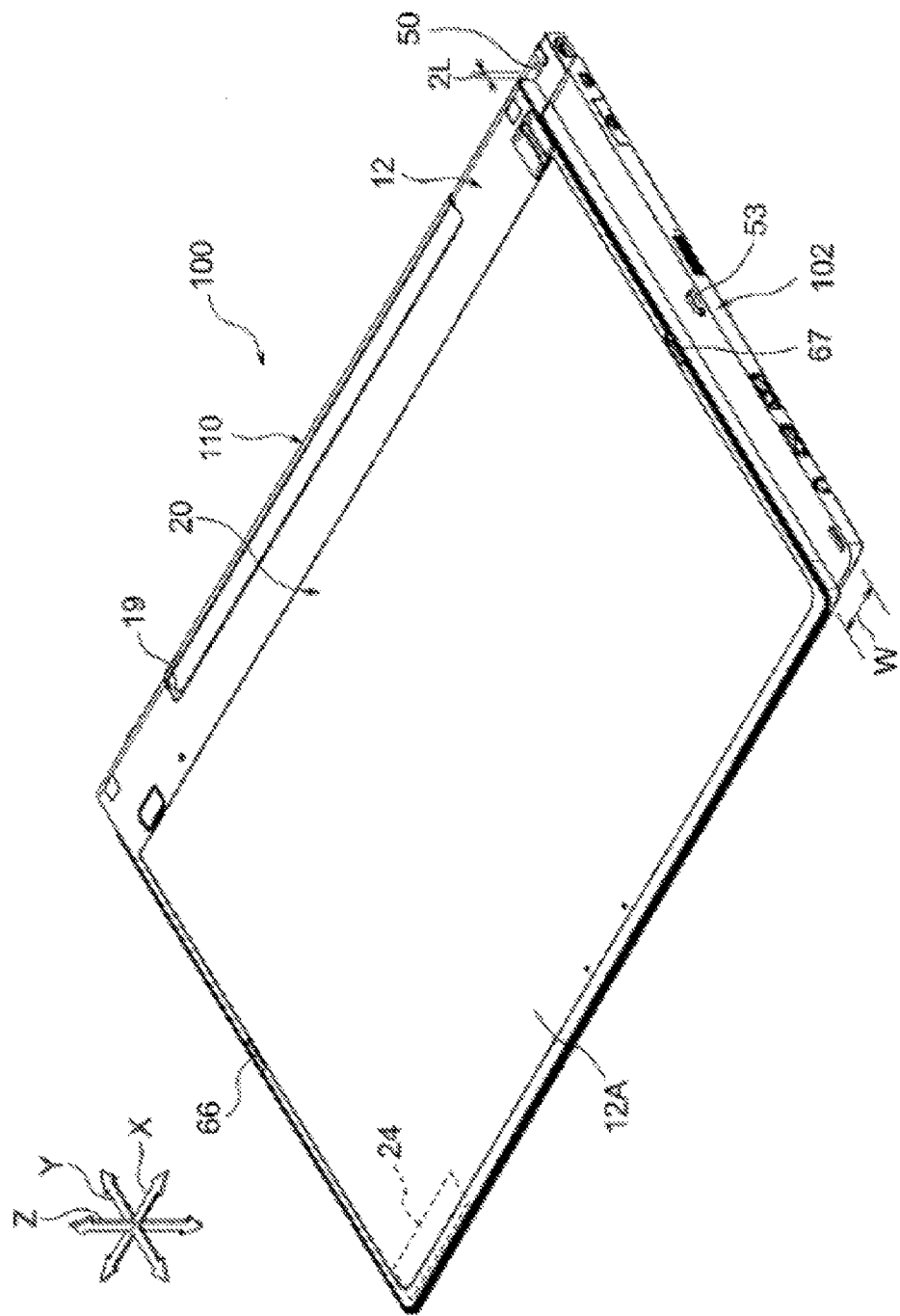
FIG. 25 is a perspective view illustrating a second closed state of the personal computer according to the second embodiment.

As illustrated in FIG. 24, the notebook personal computer 100 according to the second embodiment includes a main body case 102 as an example of the second case and a connector 110 instead of the main body case 14 and the connector 30 (see FIG. 1) in the first embodiment. In the personal computer 100, the antenna 24 is disposed at the upper right of the perimeter of the display panel 20 when the display panel 20 is viewed from the front.

The main body case 102 is made of metal as an example, and differs from the main body case 14 (see FIG. 1) in the first embodiment in that the forming position of the through hole 14D (see FIG. 18) is displaced from the forming position in the first embodiment by a distance of W toward the left side in the X direction. Other members are the same as those in the main body case 14, and the projection parts 52, 53 of the main body case 102 are inserted into the first recessed parts 67, 66 of the display case 12 in the first closed state.

The connector 110 differs from the connector 30 in that the main body 42 of the second rotation part 34 (see FIG. 12) in the first embodiment is displaced from the central position (the central position P of the display case 12 in the X direction) of the arm 44 by a distance of W toward the left side in the X direction. It is to be noted that other members are the same as those in the connector 30 (see FIG. 1). That is, the personal computer 100 in the second embodiment has the first rotation part 32 and the second rotation part 34 (see FIG. 12), and the position of the second axis K is displaced from the central position P of the display case 12 in the X direction by a distance of W in the X direction and by a distance of L in the Y direction.

In the open state of the personal computer 100, the surface 12B of the display case 12 and the end face 102A of the main body case 102 on the back side in the Y direction are aligned with each other. Furthermore, in the first closed state of the personal computer 100, the end face 15C of the display case 12 on the front side in the Y direction and the end face 102B of the main body case 102 on the front side in the Y direction are aligned with each other. In addition, in the personal computer 100, the right back of the main body case 102 is provided with the application buttons 50 that are not exposed in the first closed state, but are exposed in the second closed state as illustrated in FIG. 25.

Next, the operation and effect of the second embodiment will be described.

In the open state of the personal computer 100 illustrated in FIG. 24, the display case 12 is rotated for 180° about the second axis K as the center and is inclined with an angle 90° toward the front side in the Y direction. Thus, as illustrated in FIG. 25, the display case 12 is placed over the main body case 102 with displacement of a distance of W toward the left side in the X direction and displacement of a distance of 2 L toward the front side in the Y direction, and thus the second closed state is assumed.

Here, in the personal computer 100, at least part of the antenna 24 projects from the main body case 102 toward the outer side in the X direction and the outer side in the Y direction. For this reason, in the personal computer 100, blocking of radio waves by the main body case 102 is reduced, decrease in the receiving sensitivity of the main body case 102 is reduced compared with the comparative example, and thus decrease in the communication performance at the time of use of radio communication may be reduced.

Next, a modification of the present embodiment will be described.

Although the notebook personal computer has been described as an example of an information processing device in the above-described first and second embodiments, another information processing device such as a mobile phone in which a display case is placed over a main body case may be taken as an example.

Although the display case 12 projects toward the outer side in the X direction and in the Y direction with respect to the main body case 102 in the personal computer 100, the display case 12 may project in the X direction and may not project in the Y direction. That is, the second axis K may be arranged to overlap with the first axis J and may be displaced from the central position P in the X direction so that when the display case 12 is rotated for 180°, the display case 12 projects in the X direction by a distance of W.

In a configuration in which when the display case 12 is inclined toward the main body case 14, strong holding power acts on the first rotation part 32 and so the display case 12 is not likely to be displaced with respect to the main body case 14, the projection parts 52, 53, the second recessed parts 62, 63, and the first recessed parts 66, 67 may not be provided. The projection parts 52, 53, the second recessed parts 62, 63, and the first recessed parts 66, 67 are not necessarily disposed near the center in the Y direction and may be disposed on the back side or the front side in the Y direction. In addition, each of a projection part, a first recessed part, and a second recessed part may be provided at multiple positions such as three or more positions.

The cover member 46 may have a Y-Z cross-section which is asymmetrical on the right and left.

The application buttons 50 may be provided at the center in the X direction or on the left side in the X direction on the back side of the main body case 14 in the Y direction. Otherwise, the application buttons 50 may be provided on the entire back side of the main body case 14 in the Y direction.

The tapered surfaces 53A, 53B, the inclined surfaces 63A, 63B, and the inclined surfaces 67A, 67B may be curved surfaces.

The members used in the above-described first and second embodiments may be combined as appropriate for implementation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
a first case;
a second case over which the first case is placeable; and
a connector including a first rotation part and a second rotation part and configured to couple the first case on the second case,
the first rotation part allowing the first case to be rotated about a first axis,
the second rotation part allowing the first case to be rotated about a second axis,
the second axis being provided apart from a central position of the first axis in the first case in an axial direction of the first axis and extending in a perpendicular direction to the axial direction of the first axis,
wherein when front and back surfaces of the first case are reversed and the first case is placed over the second case, at least part of the first case projects from the second case toward an outer side.

2. The information processing device according to claim 1, wherein the first case has a communicator configured to perform communication, and when the front and back surfaces of the first case are reversed and the first case is placed over the second case, at least part of the communicator projects from the second case toward an outer side.

3. The information processing device according to claim 1, wherein the second axis is provided apart from the central position toward an inside direction of the second case by a first distance.

4. The information processing device according to claim 3, wherein the second axis is located at a position apart from the central position toward an outside direction of the second case by a second distance corresponding to twice the first distance when the front and back surfaces of the first case are reversed.

5. The information processing device according to claim 1, wherein the second case is provided with a projection part, wherein the first case is provided with a first recessed part into which the projection part is inserted when the front surface is placed over the second case, and a second recessed part into which the projection part is inserted when the back surface is placed over the second case.

6. The information processing device according to claim 5, wherein the first recessed part and the second recessed part are disposed with displacement in a direction in which the first case is displaced with respect to the second case.

7. The information processing device according to claim 6, wherein the first recessed part and the second recessed part have adjacent surfaces which are parallel.

8. The information processing device according to claim 1, wherein the second axis is provided at a position apart from the central position toward an inside direction of the second case by a first distance and apart from the central position toward the axial direction of the first axis by a second distance.

9. The information processing device according to claim 1, wherein when the first case extends in an axial direction of the second axis through an end of the second case, an end face of the second case and a surface of the first case are aligned with each other.

10. The information processing device according to claim 1, wherein the second rotation part has a rotation body that is rotatable and a projection part that projects from the rotation body along an edge of the first case.

11. The information processing device according to claim 10, wherein the rotation body has a hole into which a wire is inserted, wherein the projection part has a groove which communicates with the hole and in which the wire is stored.

12. The information processing device according to claim 11, wherein a cover member to cover the groove is attached to the groove.

13. The information processing device according to claim 12, wherein the cover member is symmetrical when viewed in the axial direction of the first axis.

14. The information processing device according to claim 1, wherein when the first case is placed over the second case with the front surface of the first case facing upward, one end face of the first case and one end face of the second case are aligned with each other.

15. The information processing device according to claim 1, wherein a perimeter of the second case is provided with an operation part which is covered by the first case when the first case extends in an axial direction of the second axis through an end of the second case, and which is exposed for operation when the front and back surfaces of the first case are reversed and the first case is placed over the second case.

16. The information processing device according to claim 1, wherein the second case is made of metal.

17. The information processing device according to claim 1, wherein the connector couples cases of a notebook personal computer.

18. An information processing device comprising:
a first case;
a second case over which the first case is placeable; and
a connector including a first rotation part and a second rotation part and configured to couple the first case on the second case,
the first rotation part allowing the first case to be rotated about a first axis,
the second rotation part allowing the first case to be rotated about a second axis,
the second axis being displaced from a central position of the first axis in the first case in an axial direction of the first axis,
wherein when front and back surfaces of the first case are reversed and the first case is placed over the second case, at least part of the first case projects from the second case toward an outer side,
wherein the second case is provided with a projection part, wherein the first case is provided with a first recessed part into which the projection part is inserted when the front surface is placed over the second case, and a second recessed part into which the projection part is inserted when the back surface is placed over the second case.

19. An information processing device comprising:
a first case;
a second case over which the first case is placeable; and
a connector including a first rotation part and a second rotation part and configured to couple the first case on the second case,
the first rotation part allowing the first case to be rotated about a first axis,
the second rotation part allowing the first case to be rotated about a second axis,
the second axis being displaced from a central position of the first axis in the first case in an axial direction of the first axis and extending without intersecting the first axis, wherein when front and back surfaces of the first case are reversed and the first case is placed over the second case, at least part of the first case projects from the second case toward an outer side.

* * * * *